(12) United States Patent  (10) Patent No.: US 12,482,081 B2
Chen  (45) Date of Patent: Nov. 25, 2025

(54) IMAGE PROCESSING METHOD AND RELATED DEVICE THEREOF

(71) Applicant: HONOR DEVICE CO., LTD., Shenzhen (CN)

(72) Inventor: Ke Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/576,053

(22) PCT Filed: Dec. 28, 2022

(86) PCT No.: PCT/CN2022/142845
§ 371 (c)(1),
(2) Date: Jan. 2, 2024

(87) PCT Pub. No.: WO2023/131028
PCT Pub. Date: Jul. 13, 2023

(65) Prior Publication Data
US 2024/0338795 A1  Oct. 10, 2024

(30) Foreign Application Priority Data
Jan. 10, 2022 (CN) .......................... 202210023807.1

(51) Int. Cl.
*H04N 23/71* (2023.01)
*G06T 5/50* (2006.01)
(Continued)

(52) U.S. Cl.
CPC .................. *G06T 5/90* (2024.01); *G06T 5/50* (2013.01); *G06T 5/60* (2024.01); *G06T 5/70* (2024.01);
(Continued)

(58) Field of Classification Search
CPC .... G06T 5/50; G06T 5/70; G06T 7/30; G06T 2207/10144; G06T 2207/20182;
(Continued)

(56) References Cited

U.S. PATENT DOCUMENTS 10,944,914 B1  3/2021  Le et al.
11,882,357 B2  1/2024  Zhou et al.
(Continued)

FOREIGN PATENT DOCUMENTS

CN  105959559 A  9/2016
CN  109636767 A  4/2019
(Continued)

OTHER PUBLICATIONS

Hao Fude, et al: "Exposure fusion algorithm in dynamic scenes based on image content assessment factor", Optical Technology, vol. 44 No. 4, Jul. 2018, 7 pages.
(Continued)

*Primary Examiner* — Chante E Harrison
(74) *Attorney, Agent, or Firm* — WOMBLE BOND DICKINSON (US) LLP

(57) ABSTRACT

This application relates to the field of image processing, and provides an image processing method and a related device thereof. The method includes: detecting a first operation; turning on a camera in response to the first operation; determining that a first preset condition is met, and capturing M frames of images; determining that a first exposure image and a third exposure image meet a second preset condition, and that a second exposure image and the third exposure image meet the second preset condition; fusing the first exposure image, the second exposure image, and the third exposure image to obtain a first target image; and storing the first target image. The image processing method provided in this application can effectively improve quality of an image
(Continued)

obtained by fusing a plurality of frames of images captured in a scene in which a color of a light source changes.

20 Claims, 15 Drawing Sheets

(51) Int. Cl.
  *G06T 5/60* (2024.01)
  *G06T 5/70* (2024.01)
  *G06T 5/90* (2024.01)
  *G06T 7/30* (2017.01)
  *H04N 23/73* (2023.01)
(52) U.S. Cl.
  CPC .............. *G06T 7/30* (2017.01); *H04N 23/71* (2023.01); *H04N 23/73* (2023.01); *G06T 2207/10144* (2013.01); *G06T 2207/20182* (2013.01); *G06T 2207/20221* (2013.01)
(58) Field of Classification Search
  CPC .......... G06T 2207/20221; H04N 23/71; H04N 23/73; H04N 23/84; H04N 23/741; H04N 23/743
  See application file for complete search history.

(56) References Cited

U.S. PATENT DOCUMENTS

| | | |
|---|---|---|
| 2015/0229819 A1 | 8/2015 | Rivard et al. |
| 2019/0199905 A1 | 6/2019 | Choi et al. |

FOREIGN PATENT DOCUMENTS

| | | | | |
|---|---|---|---|---|
| CN | 109729279 A | | 5/2019 | |
| CN | 109788207 A | | 5/2019 | |
| CN | 110198417 A | | 9/2019 | |
| CN | 111418201 A | | 7/2020 | |
| CN | 111741211 A | | 10/2020 | |
| CN | 112818732 A | | 5/2021 | |
| CN | 113379615 A | * | 9/2021 | .............. G06T 5/50 |
| CN | 113382169 A | | 9/2021 | |
| CN | 113781358 A | | 12/2021 | |
| CN | 113824873 A | | 12/2021 | |
| CN | 110958401 B | * | 8/2022 | ............. H04N 23/88 |
| KR | 20120107041 A | * | 9/2012 | ........... G06T 3/4015 |
| WO | 2019183813 A1 | | 10/2019 | |

OTHER PUBLICATIONS

Ma Ze-long, et al: "Auto exposure control for high frame rate camera using image histogram feature function", Optics and Precision Engineering, vol. 25 No. 4, Apr. 2017, 10 pages.

S. Payra, G. Loke and Y. Fink, "Enabling Adaptive Robot-Environment Interaction and Context-Aware Artificial Somatosensory Reflexes through Sensor-Embedded Fibers," 2020 IEEE MIT Undergraduate Research Technology Conference (URTC), Cambridge, MA, USA, 2020, pp. 1-4.

* cited by examiner

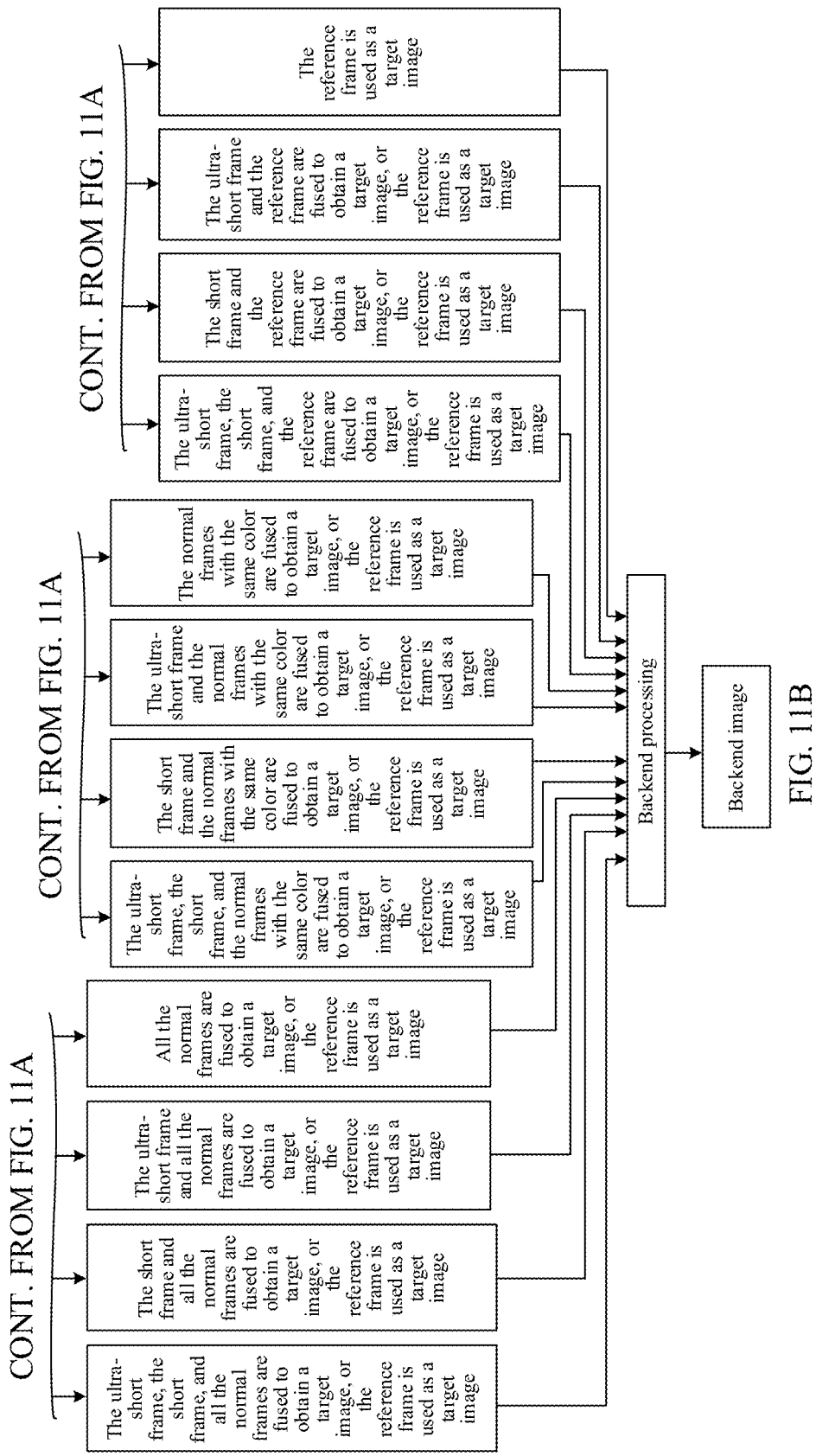

IMAGE PROCESSING METHOD AND RELATED DEVICE THEREOF

CROSS-REFERENCE TO RELATED APPLICATIONS

This application is a national stage of International Application No. PCT/CN2022/142845, filed on Dec. 28, 2022, which claims priority to Chinese Patent Application No. 202210023807.1, filed on Jan. 10, 2022, both of which are incorporated herein by reference in their entireties.

TECHNICAL FIELD

This application relates to the field of image processing, and in particular, to an image processing method and a related device thereof.

BACKGROUND

With wide application of electronic devices, taking photos with the electronic devices has become a daily behavior in people's lives. Using an example in which the electronic device is a mobile phone, a plurality of algorithms such as multi-frame fusion emerge accordingly to improve image quality.

However, in some scenes in which a color of a light source constantly changes, because the light source in the scene to be shot emits light of different colors at different moments and the color changes in very short time, same content in a plurality of frames of images captured by a camera corresponds to different colors. Consequently, an image obtained by fusing the plurality of frames of images is seriously distorted. This cannot be effectively resolved in the prior art. Therefore, how to improve quality of the image obtained by fusing the plurality of frames of images captured in the scene in which the color of the light source changes has become a problem to be urgently resolved.

SUMMARY

This application provides an image processing method and a related device thereof, to perform image fusion on a plurality of frames of images captured in a scene in which a color of a light source constantly changes, and correct a color during the fusion, thereby improving quality, and improving user experience.

To achieve the foregoing objective, the following technical solutions are used in this application:

According to a first aspect, an image processing method is provided, and is applied to an electronic device that includes a camera. The method includes:
  detecting a first operation;
  turning on the camera in response to the first operation;
  determining that a first preset condition is met, and capturing M frames of images, where the M frames of images include a first exposure image, a second exposure image, and a third exposure image, an exposure value of the first exposure image is less than an exposure value of the second exposure image, and the exposure value of the second exposure image is less than an exposure value of the third exposure image, where M is an integer greater than or equal to 2;
  determining that the first exposure image and the third exposure image meet a second preset condition, and that the second exposure image and the third exposure image meet the second preset condition;
  fusing the first exposure image, the second exposure image, and the third exposure image to obtain a first target image; and
  storing the first target image.

This embodiment of this application provides an image processing method, so that before the fusion, it is determined, by using one frame of image as a reference frame, whether a color of an image in the plurality of frames of exposure images changes. Based on a determining result, the target image is determined according to at least one frame of exposure image in the plurality of frames of exposure images. Therefore, according to the image processing method provided in this embodiment of this application, one or more frames of exposure images are reasonably selected according to a determining situation to obtain the target image, so that quality of the processed target image can be improved.

In a possible implementation of the first aspect, the M frames of images further include a fourth exposure image, and an exposure value of the fourth exposure image is equal to the exposure value of the third exposure image.

It is determined that the first exposure image and the third exposure image meet the second preset condition, that the second exposure image and the third exposure image meet the second preset condition, and that the fourth exposure image and the third exposure image meet the second preset condition.

The first exposure image, the second exposure image, the third exposure image, and the fourth exposure image are fused to obtain a second target image.

The second target image is stored.

In a possible implementation of the first aspect, it is determined that the first exposure image and the third exposure image do not meet the second preset condition, and that the second exposure image and the third exposure image meet the second preset condition.

The second exposure image and the third exposure image are fused to obtain a third target image.

The third target image is stored.

In a possible implementation of the first aspect, when the M frames of images further include the fourth exposure image, the exposure value of the fourth exposure image is equal to the exposure value of the third exposure image.

It is determined that the first exposure image and the third exposure image do not meet the second preset condition, that the second exposure image and the third exposure image meet the second preset condition, and that the fourth exposure image and the third exposure image meet the second preset condition.

The second exposure image, the third exposure image, and the fourth exposure image are fused to obtain a fourth target image.

The fourth target image is stored.

In a possible implementation of the first aspect, it is determined that the first exposure image and the third exposure image meet the second preset condition, and that the second exposure image and the third exposure image do not meet the second preset condition.

The first exposure image and the third exposure image are fused to obtain a fifth target image.

The fifth target image is stored.

In a possible implementation of the first aspect, when the M frames of images further include the fourth exposure image, the exposure value of the fourth exposure image is equal to the exposure value of the third exposure image.

It is determined that the first exposure image and the third exposure image meet the second preset condition, that the second exposure image and the third exposure image do not meet the second preset condition, and that the fourth exposure image and the third exposure image meet the second preset condition.

The first exposure image, the third exposure image, and the fourth exposure image are fused to obtain a sixth target image.

The sixth target image is stored.

In a possible implementation of the first aspect, it is determined that the first exposure image and the third exposure image do not meet the second preset condition, and that the second exposure image and the third exposure image do not meet the second preset condition.

It is determined that the third exposure image is a seventh target image.

The seventh target image is stored.

In a possible implementation of the first aspect, when the M frames of images further include the fourth exposure image, the exposure value of the fourth exposure image is equal to the exposure value of the third exposure image.

It is determined that the first exposure image and the third exposure image do not meet the second preset condition, that the second exposure image and the third exposure image do not meet the second preset condition, and that the fourth exposure image and the third exposure image meet the second preset condition.

The third exposure image and the fourth exposure image are fused to obtain an eighth target image.

The eighth target image is stored.

In a possible implementation of the first aspect, the method further includes:

performing front-end processing on the M frames of images to obtain M frames of processed exposure images.

In this implementation, the front-end processing is first performed on the M frames of images, to repair defects in the obtained exposure images, and improve quality of the exposure images.

In a possible implementation of the first aspect, the front-end processing includes: at least one of image registration, lens shading correction, black level correction, noise reduction, auto white balance, and down-sampling.

In a possible implementation of the first aspect, the method further includes: performing backend processing on a target image to obtain a backend image, where the target image includes at least one of the first target image, the second target image, the third target image, the fourth target image, the fifth target image, the sixth target image, the seventh target image, and the eighth target image.

In this implementation, after the target image is obtained, the backend processing is performed on the target image, to repair a defect and a deficiency generated in the fusion process, and correct and compensate for the target image.

In a possible implementation of the first aspect, the backend processing includes: at least one of nonlinear superposition and ghost correction.

According to a second aspect, an image processing apparatus is provided. The apparatus includes a unit configured to perform each step according to any one of the first aspect or the possible implementations of the first aspect.

According to a third aspect, an electronic device is provided, including: one or more processors and a memory, where the memory is coupled to the one or more processors, and is configured to store computer program code; the computer program code includes computer instructions; and the one or more processors invoke the computer instructions to cause the electronic device to perform the step processed in the image processing method according to any one of the first aspect or the possible implementations of the first aspect.

According to a fourth aspect, a chip is provided, including: a processor, configured to invoke a computer program from a memory and run the computer program to cause a device installed with the chip to perform the step processed in the image processing method according to any one of the first aspect or the possible implementations of the first aspect.

According to a fifth aspect, a computer-readable storage medium is provided. The computer-readable storage medium stores a computer program, and the computer program includes program instructions. When the program instructions are executed by a processor, the processor is caused to perform the step processed in the image processing method according to any one of the first aspect or the possible implementations of the first aspect.

According to a sixth aspect, a computer program product is provided. The computer program product includes a computer-readable storage medium that stores a computer program. The computer program causes a computer to perform the step processed in the image processing method according to any one of the first aspect or the possible implementations of the first aspect.

For beneficial effects of the second aspect to the sixth aspect, refer to the beneficial effects of the first aspect, and details are not described herein again.

BRIEF DESCRIPTION OF DRAWINGS

FIG. 11A and FIG. 11B are another schematic flowchart of an image processing method according to an embodiment of this application;

DESCRIPTION OF EMBODIMENTS

Figure 1:
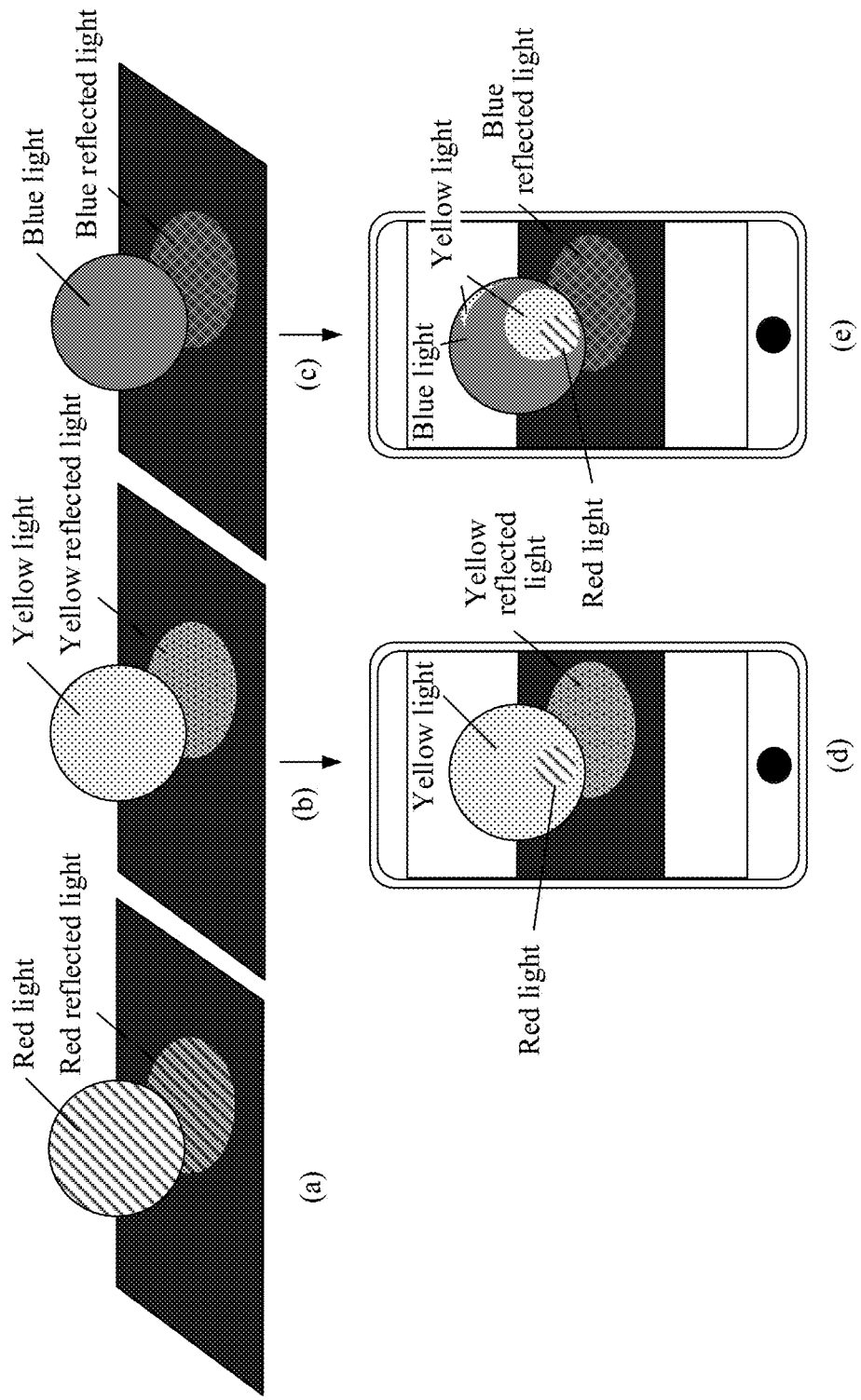
FIG. 1 shows an application scenario according to an embodiment of this application.

The following describes technical solutions of this application with reference to the accompanying drawings.

In descriptions of embodiments of this application, "/" means "or" unless otherwise specified. For example, A/B may represent A or B. In this specification, "and/or" describes only an association relationship between associated objects and indicates that three relationships may exist. For example, A and/or B may represent the following three cases: Only A exists, both A and B exist, and only B exists. In addition, in the descriptions of the embodiments of this application, "a plurality of" represents two or more.

The terms "first" and "second" below are used merely for the purpose of description, and shall not be construed as indicating or implying relative importance or implying a quantity of indicated technical features. Therefore, a feature limited by "first" or "second" may explicitly or implicitly include one or more of the features. In descriptions of the embodiments, unless otherwise stated, "a plurality of" means two or more.

Some terms in the embodiments of this application are first described for ease of understanding by a person skilled in the art.

1. RGB (red, green, blue) color space or RGB domain: refers to a color model related to a structure of a human visual system. According to a structure of human eyes, all colors are considered as different combinations of red, green, and blue.
2. Pixel value: refers to a set of color components corresponding to each pixel in a color image in the RGB color space. For example, each pixel corresponds to one set of three-primary-color components, where the three-primary-color components are respectively a red component R, a green component G, and a blue component B.
3. Bayer image (bayer image): is an image that is output by an image sensor that is based on a Bayer color filter array. Pixels of various colors in the image are arranged in a Bayer format. Each pixel in the Bayer image corresponds to a channel signal of only one color. For example, because human vision is sensitive to green, a green pixel (a pixel corresponding to a green channel signal) may be set to account for 50% of all pixels, and a blue pixel (a pixel corresponding to a blue channel signal) and a red pixel (a pixel corresponding to a red channel signal) each may be set to account for 25% of all the pixels. A minimal repeating unit of the Bayer image is: one red pixel, two green pixels, and one blue pixel that are arranged in a 2×2 form. An image arranged in the Bayer format may be considered as being in a RAW domain.
4. Image registration (image registration): refers to matching of geographical coordinates of different images in a same area that are obtained through different imaging methods. The image registration includes processing in terms of three aspects, namely, geometric correction, projection transformation, and scale unification.
5. Ghost correction In an imaging optical system, there are one or more "fake" image points similar to an image point near the image point, and all the "false" image points other than the image point are collectively referred to as "ghost". The ghost correction means correcting and eliminating the "false" image point. A processing method corresponding to the ghost correction may be, for example, an optical flow algorithm. The image point is any point on an image.

6. Lighting value (lighting value, LV): is used to estimate ambient luminance, and a specific calculation formula therefor is as follows:

$$LV = 10 \times \log_2\left(\frac{\text{Aperture}^2}{\text{Exposure}} \times \frac{100}{ISO} \times \frac{\text{Luma}}{46}\right)$$

Exposure is exposure time, Aperture is an aperture size, ISO is photosensibility, and Luma is an average value of Y in XYZ color space.

7. Dynamic range (dynamic range) value: represents proportion information of an overexposed area in an entire preview image obtained by a camera.
8. Shooting parameter The shooting parameter may include a shutter, exposure time, an aperture value (aperture value, AV), an exposure value (exposure value, EV), and photosensibility, namely, ISO. Descriptions are separately provided below.

The shutter is an apparatus that controls time of light entering a camera to determine exposure time of an image. Longer time for which the shutter is on indicates more light that enters the camera and longer exposure time corresponding to the image. On the contrary, shorter time for which the shutter is on indicates less light that enters the camera and shorter exposure time corresponding to the image.

The exposure time refers to time for which the shutter needs to be on to project the light onto a photosensitive surface of a photosensitive material of the camera. The exposure time is determined based on photosensibility of the photosensitive material and illumination on the photosensitive surface. Longer exposure time indicates more light that enters the camera, and shorter exposure time indicates less light that enters the camera. Therefore, longer exposure time is needed in a dark scene, and shorter exposure time is needed in a backlight scene.

The aperture value (f value) is a ratio of a focal length of a lens (lens) in the camera to a light passing diameter of the lens. A larger aperture value indicates more light that enters the camera. A smaller aperture value indicates less light that enters the camera.

The exposure value is a value that is obtained by combining the exposure time and the aperture value and that represents a light passing capability of the lens of the camera. The exposure value may be defined as:

$$EV = \log_2 \frac{N^2}{t}$$

N is the aperture value. t is the exposure time in seconds.

The ISO is used to measure sensitivity of a negative film to light, namely, photosensibility or a gain. An insensitive negative film needs longer exposure time to achieve an image with same luminance as a sensitive negative film. A sensitive negative film needs shorter exposure time to achieve an image with same luminance as an insensitive negative film.

For the shutter, the exposure time, the aperture value, the exposure value, and the ISO among the shooting parameters, an electronic device can implement at least one of auto focus (auto focus, AF), automatic exposure (automatic exposure, AE), and auto white balance (auto white balance, AWB) through an algorithm, to achieve automatic adjustment of these shooting parameters.

For example, the exposure value may be any one of −24, −4, −3, −2, −1, 0, 1, 2, 3, 4, and 24.

An exposure image corresponding to EV0 represents an exposure image captured by using the determined exposure value 0 when the electronic device implements exposure by using an algorithm. An exposure image corresponding to EV−2 represents an exposure image captured by using the determined exposure value −2 when the electronic device implements exposure by using the algorithm. An exposure image corresponding to EV1 represents an exposure image captured by using the determined exposure value 1 when the electronic device implements exposure by using the algorithm. The rest can be deduced by analogy, and details are not described herein.

Every increase of the exposure value by 1 indicates a change by one stop of exposure, to be specific, doubles an exposure amount (which refers to an integral of illumination received by a specific surface element on a surface of an object in time t), for example, doubles the exposure time or an aperture area. In this case, the increase of the exposure value corresponds to a slower shutter speed and a smaller value of f. Therefore, for the exposure value, EV0 is greater than EV−2 plus 2, indicating a change by two stops of exposure. Similarly, for the exposure value, EV1 is greater than EV0 plus 1, indicating a change by one stop of exposure.

Herein, when the exposure value EV is equal to 0, the exposure value is usually an optimal exposure value under a current illumination condition. Correspondingly, an exposure image obtained by the electronic device under the condition of EV0 is an optimal exposure image under the current illumination condition. The optimal exposure image may also be referred to as a reference exposure image.

It should be understood that the "optimal" exposure image refers to an exposure image determined by a given electronic device by using an algorithm, and varies with the electronic device, the algorithm, or the current illumination condition.

The terms in the embodiments of this application are briefly described above, and details are not described below again.

With wide application of electronic devices, taking photos with the electronic devices has become a daily behavior in people's lives. Using an example in which the electronic device is a mobile phone, a plurality of algorithms such as multi-frame fusion emerge accordingly to improve image quality.

However, in some scenes in which a color of a light source constantly changes, because the light source in the scene to be shot emits light of different colors at different moments and the color changes in very short time, same content in a plurality of frames of images captured by a camera corresponds to different colors. Consequently, a color of one frame of image obtained by fusing the plurality of frames of images is seriously distorted. This cannot be effectively resolved in the prior art. Therefore, how to improve quality of the image obtained by fusing the plurality of frames of images captured in the scene in which the color of the light source changes has become a problem to be urgently resolved.

Figure 2:
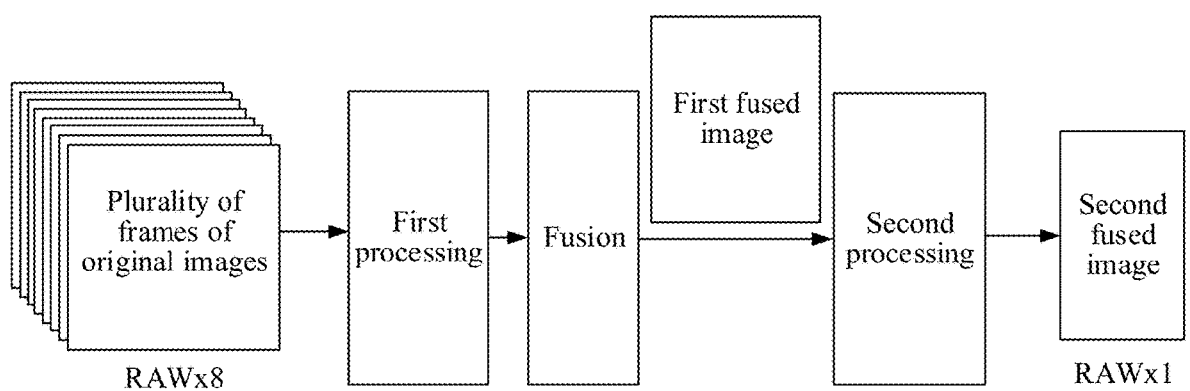
FIG. 2 is a schematic flowchart of a related image processing method.

FIG. 1 shows an application scenario according to an embodiment of this application. FIG. 2 is a flowchart of a related image processing method according to an embodiment of this application.

As shown in FIG. 1, a luminous nightlight is placed on a table. When the nightlight is on, the nightlight can emit red light, yellow light, or blue light, and emits light of one color at a time. A color of emitted light constantly changes. When the nightlight emits light of different colors, because the desktop is smooth, the desktop also reflects some light of corresponding colors.

As shown in FIG. 2, when shooting this scene with a mobile phone, a camera continuously captures a plurality of frames of original images in response to one tap operation of a user on a shooting interface. The plurality of frames of original images are all images in a RAW domain.

A related image processing method is as follows: performing first processing such as image registration on the plurality of frames of original images; then, fusing the plurality of frames of original images on which the first processing has been performed, to correspondingly generate one frame of first fused image; and performing second processing such as ghost correction on the first fused image to obtain one corresponding frame of second fused image. In this way, it is expected to improve quality of the obtained second fused image through multi-frame fusion.

In the scene shown in FIG. 1, in an example 1, as shown in (a) and (b) in FIG. 1, it is assumed that when the camera continuously captures the plurality of frames of original images, the nightlight exactly changes from emitting the red light to emitting the yellow light. In this case, the plurality of frames of original images captured by the camera may include both an original image reflecting that the nightlight emits the red light and an original image reflecting that the nightlight emits the yellow light. Therefore, with reference to the procedure corresponding to the foregoing related image processing method, the second fused image generated by fusing the plurality of frames of original images reflecting that the nightlight emits light of different colors may be as shown in (d) in FIG. 1. In the second fused image, a part of the nightlight emits the red light, the other part of the nightlight emits the yellow light, and the desktop reflects the red light. It can be learned that because impact of the color change of the light source is not considered, the color of the second fused image obtained through fusion is partially deviated seriously. This causes very poor shooting experience of a user.

In the scene shown in FIG. 1, in an example 2, as shown in (a) to (c) in FIG. 1, it is assumed that when the camera continuously captures the plurality of frames of original images, the nightlight changes from emitting the red light to emitting the yellow light, and then changes from emitting the yellow light to emitting the blue light. In this case, in the plurality of frames of original images captured by the camera that have different exposure time, a scene in which the nightlight emits the red light may be shot in an original image with longer exposure time, a scene in which the nightlight emits the blue light may be shot in an original image with shorter exposure time, and a scene in which the nightlight emits the yellow light may be shot in an original image with intermediate exposure time. Therefore, with reference to the procedure corresponding to the foregoing related image processing method, the second fused image generated by fusing the plurality of frames of original images reflecting that the nightlight emits light of different colors may be as shown in (e) in FIG. 1, to be specific, a part of the nightlight emits the blue light, a part of the nightlight emits the yellow light, a remaining part of the nightlight emits the red light, and the desktop reflects the blue light. It can be learned that because impact of the color change of the light source is not considered, the color of the second fused image obtained through fusion is partially deviated seriously. The fusion does not improve but damages the quality of the image. This causes very poor shooting experience of a user.

When the scene shown in FIG. 1 has a plurality of light sources of different colors, and a color of one or more light sources changes, a color situation of the plurality of frames of original images captured by the camera is more complex. After the plurality of frames of original images reflecting that the nightlight emits light of a plurality of colors are fused with reference to the procedure corresponding to the foregoing related image processing method, colors of more parts in the generated second fused image are deviated, and quality is worse. The foregoing is merely several examples, and this is not limited in the embodiments of this application.

In view of this, the embodiments of this application provide an image processing method, to perform frame color determining on a plurality of frames of captured exposure images; and select a part or all of the images based on a frame color determining result and according to a preset rule for fusion, select images of a same color for fusion, or skip fusion but output only a single frame of image. Therefore, according to the image processing method provided in the embodiments of this application, a color of a subsequently obtained image can be corrected through the frame color determining, to improve quality of the image.

The following describes the image processing method in the embodiments of this application in detail with reference to the accompanying drawings.

Figure 3:
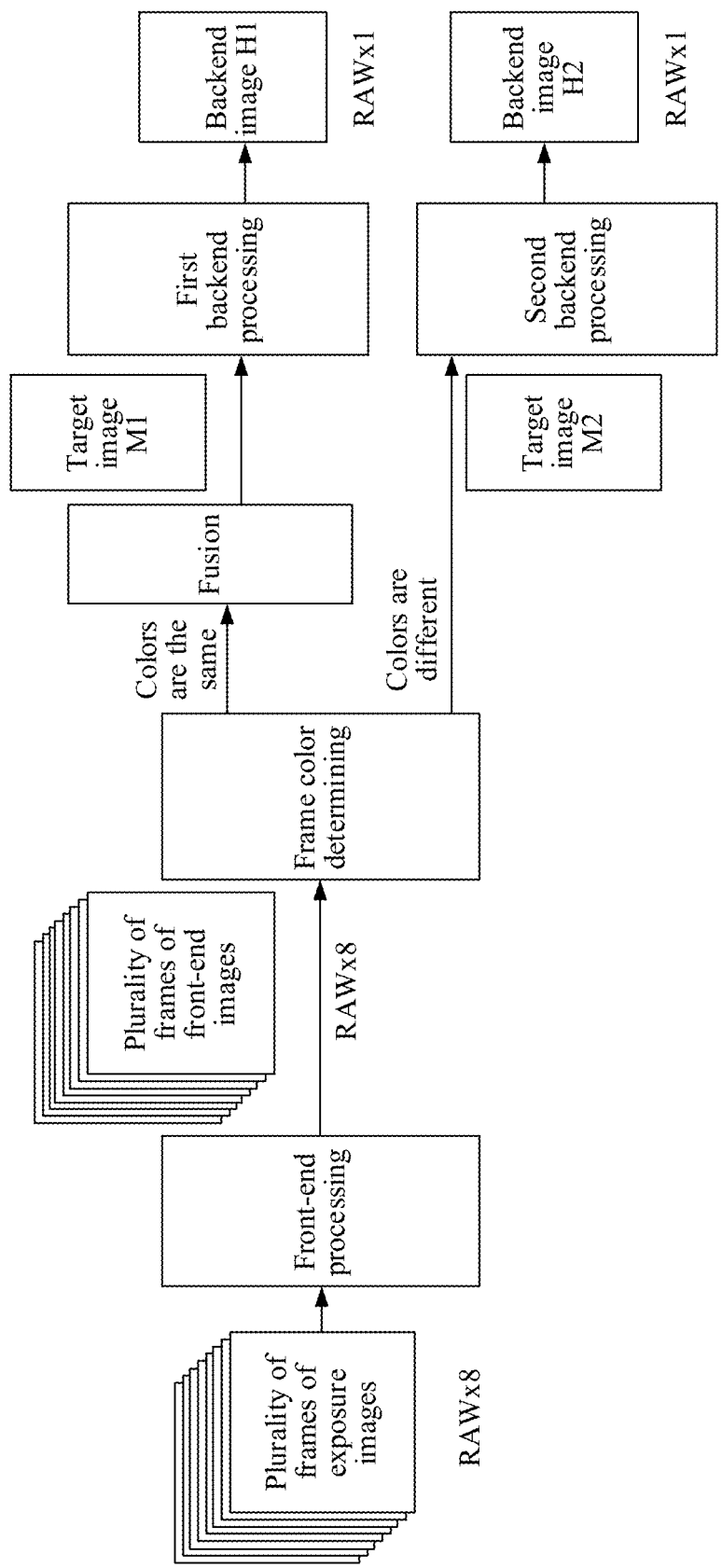
FIG. 3 is a schematic diagram of an image processing method according to an embodiment of this application.

FIG. 3 is a flowchart of an image processing method according to an embodiment of this application. The method is applied to an electronic device.

As shown in FIG. 3, the image processing method provided in this embodiment of this application may include S110 to S160. These steps are described below in detail.

S110: Obtain a plurality of frames of exposure images.

Optionally, the plurality of frames of exposure images correspond to different exposure values. For example, at least two frames of exposure images in the plurality of frames of exposure images correspond to different aperture values, and the plurality of frames of exposure images correspond to same exposure time. Alternatively, the plurality of frames of exposure images correspond to a same aperture value, and at least two frames of exposure images in the plurality of frames of exposure images correspond to different exposure time.

Optionally, the plurality of frames of exposure images correspond to a same exposure value. For example, the plurality of frames of exposure images correspond to a same aperture value and same exposure time.

In some embodiments, the electronic device may include one or more image sensors. In this case, the electronic device can control the one or more image sensors to shoot, to obtain the plurality of frames of exposure images. In some other embodiments, regardless of whether the electronic device includes an image sensor, the electronic device may locally store the plurality of frames of exposure images or obtain the plurality of frames of exposure images from another device. For example, a user may capture the plurality of frames of exposure images by using a first electronic device D1, and then send the plurality of frames of exposure images to a second electronic device D2. After receiving the plurality of frames of exposure image, the second electronic device D2 may perform the image processing method provided in this embodiment of this application for image processing. Certainly, in an actual application process, the electronic device may alternatively obtain the plurality of frames of exposure images in another manner. This is not limited in this embodiment of this application.

Before obtaining the plurality of frames of exposure images, the electronic device may first perform determining on a scene to be shot, to determine whether it is necessary to shoot the scene to be shot, and obtain the plurality of frames of exposure images if necessary.

For example, the electronic device may determine whether the scene to be shot is a dark scene or a high dynamic range (high dynamic range, HDR) scene. When it is determined that the scene to be shot is the dark scene or the HDR scene, the plurality of frames of exposure images are obtained for the scene to be shot. When the scene to be shot is not the dark scene or the HDR scene, the plurality of frames of exposure images are not obtained.

The dark scene may be determined according to a lighting value, and a process may specifically include: when the lighting value corresponding to the scene to be shot is less than a lighting value threshold, determining that the scene is the dark scene, otherwise, determining that the scene is not the dark scene. The example herein in which the lighting value is less than the lighting value threshold is a first preset condition. In other words, the electronic device captures the plurality of frames of exposure images only when the first preset condition is met.

In addition, the HDR scene may be determined according to a dynamic range (dynamic range, DR) value, and a process may specifically include: when the DR value corresponding to the scene to be shot is greater than a preset dynamic range value, determining that the scene is the HDR scene, otherwise, determining that the scene is not the HDR scene. Certainly, whether it is necessary to obtain the plurality of frames of exposure images may alternatively be determined in another manner. This is not limited in this embodiment of this application. The example herein in which the DR value is greater than the preset dynamic range value is a first preset condition. In other words, the electronic device captures the plurality of frames of exposure images only when the first preset condition is met.

It should be understood that the plurality of frames of exposure images may be exposure images directly generated by the image sensor, or may be images obtained by performing one or more processing operations on the exposure images.

It should be understood that the plurality of frames of exposure images include two or more frames of exposure images. The plurality of frames of exposure images are all Bayer images, namely, images in a RAW domain. Herein, when the plurality of frames of exposure images are the images in the RAW domain, it means that subsequent processing is performed in the RAW domain, to keep more details and improve quality of a subsequent image. Certainly, the plurality of frames of exposure images may alternatively be RGB images or YUV images. This is not limited in this embodiment of this application.

It should be understood that the plurality of frames of exposure images may be images obtained by continuously shooting a same scene to be shot, where an interval between two adjacent frames of exposure images obtained through exposure may be ignored relative to exposure time of any frame of exposure image.

It should be understood that each exposure image in the plurality of frames of exposure images corresponds to one start exposure moment and one end exposure moment, and duration from the start exposure moment to the end exposure moment is exposure time corresponding to the exposure image. All the start exposure moment, the end exposure moment, the exposure time, and the exposure value corresponding to the exposure image may be carried in the exposure image or stored in correspondence with the exposure image.

It should be understood, that at least two frames of exposure images in the plurality of frames of exposure images correspond to different aperture values means: In some embodiments, the plurality of frames of exposure images correspond to different aperture values. In some other embodiments, some exposure images correspond to a same aperture value, and the other exposure images (more than or equal to two frames of exposure images) correspond to different aperture values.

It should be understood, that at least two frames of exposure images in the plurality of frames of exposure images correspond to different exposure time means: In some embodiments, the plurality of frames of exposure images correspond to different exposure time. In some other embodiments, some exposure images correspond to same exposure time, and the other exposure images (more than or equal to two frames of exposure images) correspond to different exposure time.

Herein, an exposure manner of the plurality of frames of exposure images is not limited in this embodiment of this application. For example, the plurality of frames of exposure images correspond to the same aperture value, and the exposure time corresponding to the plurality of frames of exposure images sequentially increases in an exposure order. Alternatively, for example, the plurality of frames of exposure images correspond to the same aperture value; and a part of the plurality of frames of exposure images correspond to long exposure time, the other part of the plurality of frames of exposure images correspond to short exposure time, and there is no rule to follow. A time interval between any two times of exposure is neglected.

Figure 4:
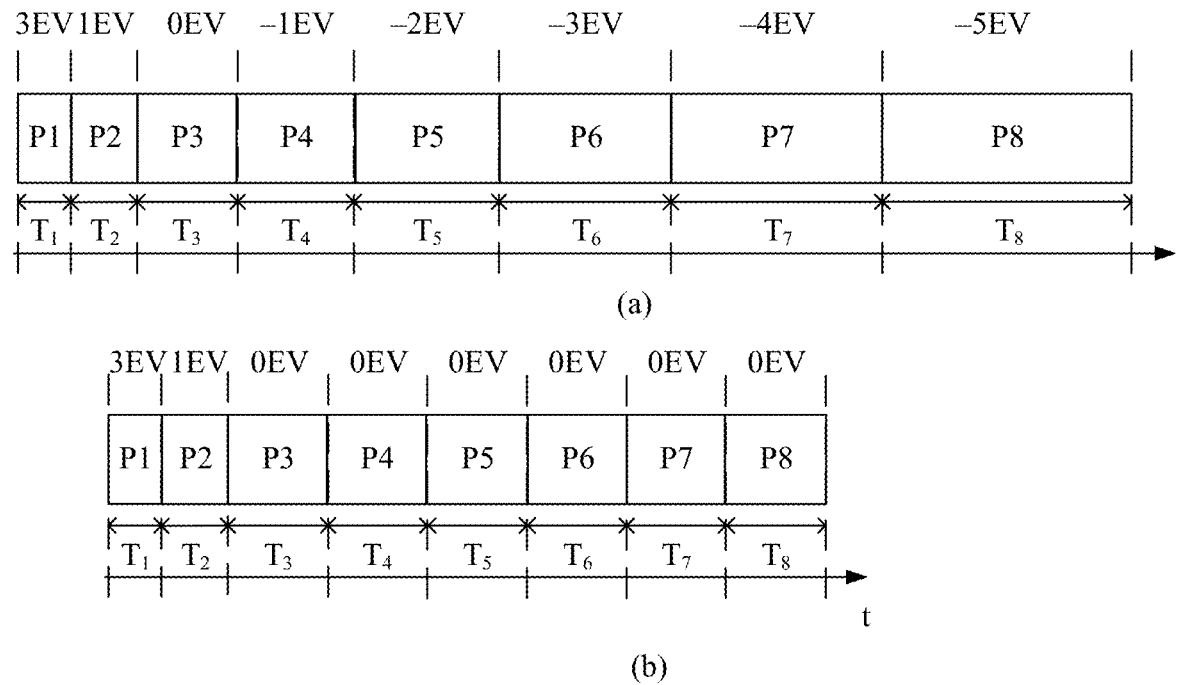
FIG. 4 shows an exposure manner according to an embodiment of this application.

In an example 1, FIG. 4 shows an exposure manner according to this embodiment of this application. As shown in (a) in FIG. 4, it is assumed that the aperture value remains unchanged; and the electronic device performs exposure continuously for eight times, to obtain a sequence including eight frames of exposure images, namely, an exposure image P1 to an exposure image P8. Exposure time corresponding to the exposure image P1 is T1, and exposure time corresponding to the exposure image P2 is T2, where T2>T1. Exposure time corresponding to the exposure image P3 is T3, where T3>T2. By analogy, exposure time corresponding to the exposure image P7 is T7, and exposure time corresponding to exposure image P8 is T8, where T8>T7.

Therefore, an exposure image whose exposure value is 0 EV may be determined from the eight frames of exposure images, and the exposure image corresponding to 0 EV is referred to as a reference frame or the first normal (normal) frame. In addition, it is determined, by using 0 EV as a first preset exposure value, that all exposure images whose exposure values are greater than or equal to 0 EV are normal frames, or that only the exposure image whose exposure value is equal to 0 EV is the normal frame. For exposure images whose exposure values are less than 0 EV, a second preset exposure value less than 0 EV may be further set to distinguish between an ultra-short frame and a short frame. For example, the second preset exposure value is set to −2 EV, to be specific, when exposure values corresponding to a plurality of frames of exposure images are less than 0 EV, if an exposure value corresponding to an exposure image is less than −2 EV, the exposure image may be referred to as the ultra-short frame; otherwise, the exposure image may be referred to as the short frame.

Figure 5:
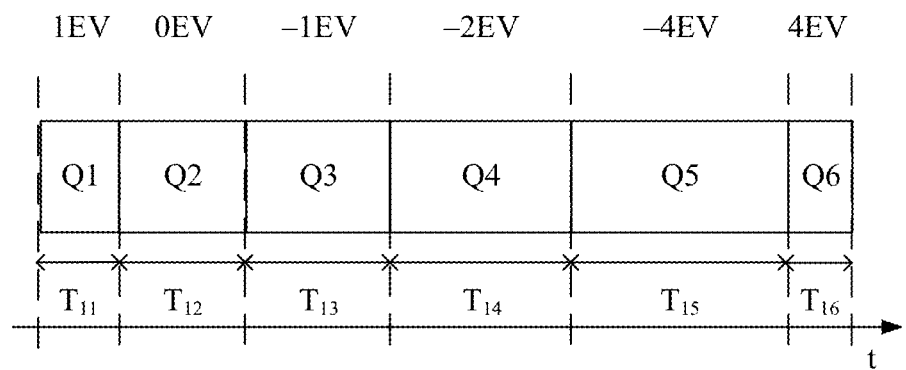
FIG. 5 shows another exposure manner according to an embodiment of this application.

As shown in (a) in FIG. 4, if an exposure value corresponding to the third frame of exposure image P3 is 0 EV (also referred to as EV0), the third frame of exposure image P3 may be selected as the reference frame, namely, the first normal frame. Exposure values of the fourth frame of exposure image P4 to the eighth frame of exposure image are all greater than 0 EV. Therefore, the fourth frame of exposure image P4 to the eighth frame of exposure image may also be referred to as normal frames or long frames. Alternatively, as shown in (b) in FIG. 4, exposure values of the fourth frame of exposure image P4 to the eighth frame of exposure image P8 are all 0 EV that is the same as the exposure value of the reference frame. Therefore, the fourth frame of exposure image P4 to the eighth frame of exposure image P8 may also be referred to as normal frames. An exposure value of the second frame of exposure image P2 is −1 EV that is less than 0 EV and greater than −2 EV In this case, the second frame of exposure image P2 may be referred to as the short frame. An exposure value of the first frame of exposure image P1 is −3 EV that is less than −2 EV In this case, the first frame of exposure image P1 may be referred to as the ultra-short frame. Optionally, the exposure value of the second frame of exposure image P2 may alternatively be −2 EV, and the exposure value of the first frame of exposure image P1 may alternatively be −4 EV In an example 2, FIG. 5 shows another exposure manner according to this embodiment of this application. As shown in FIG. 5, the electronic device performs exposure continuously for six times, to obtain a sequence including six frames of exposure images, namely, an exposure image Q1 to an exposure image Q6. Exposure time corresponding to the exposure image Q1 is T11, and exposure time corresponding to the exposure image Q2 is T12. The rest can be deduced by analogy. Exposure time corresponding to the exposure image Q5 is T15, and exposure time corresponding to the exposure image Q6 is T16.

As shown in FIG. 5, T11 to T16 are different in values, where T15 is the largest, and T16 is the smallest. If an exposure value corresponding to the second frame of exposure image Q2 is 0 EV (also referred to as EV0), the second frame of exposure image Q2 may be selected and referred to as the first normal frame. Exposure values corresponding to the third frame of exposure image Q3 to the fifth frame of exposure image Q5 are all greater than 0 EV Therefore, all the third frame of exposure image Q3 to the fifth frame of exposure image Q5 may be referred to as normal frames. An exposure value of the first frame of exposure image Q1 is less than 0 EV and greater than a second preset exposure value (for example, −2 EV). In this case, the first frame of exposure image Q1 may be referred to as a short frame. Because an exposure value of the sixth frame of exposure image Q6 is less than −2 EV, the sixth frame of exposure image Q6 may be referred to as an ultra-short frame.

It should be understood that the foregoing is merely several manners of classifying the plurality of frames of exposure images into the ultra-short frame, the short frame, and the normal frame. Certainly, the ultra-short frame, the short frame, and the normal frame may alternatively be obtained through classification according to another exposure value. Alternatively, the plurality of frames of exposure images may be classified into only the ultra-short frame and the short frame, into only the ultra-short frame and the normal frame, or into only the short frame and the normal frame. This is not limited in this embodiment of this application. Quantities of ultra-short frames, short frames, and normal frames are not limited in this embodiment of this application.

S120: Perform front-end processing on the plurality of frames of exposure images to obtain a plurality of frames of processed exposure images. The processed exposure image may also be referred to as a front-end image.

Optionally, the front-end processing may include: at least one of image registration, black level correction (black level correction, BLC), lens shading correction (lens shading correction, LSC), auto white balance (auto white balance, AWB), noise reduction, and down-sampling.

The black level correction is performed to correct a black level. The lens shading correction is performed to eliminate a problem, caused by a lens optical system, that a color and luminance at the periphery of an image are inconsistent with those at the center of the image. The auto white balance is performed to cause white to be accurately presented by a camera at any color temperature. The noise reduction is performed to filter out noise in an image and keep more details in the image. For example, a convolutional neural network model (convolutional neural networks, CNN) may be used for the noise reduction. The down-sampling is performed to reduce a size of an image and reduce an amount of calculation in subsequent image processing.

When the front-end processing includes a plurality of the foregoing processing steps, a processing sequence of the plurality of processing steps may be set and adjusted as required. This is not limited in this embodiment of this application. Certainly, the front-end processing may alternatively include another step. A specific step may be selected as required. This is not limited in this embodiment of this application.

Figure 6:
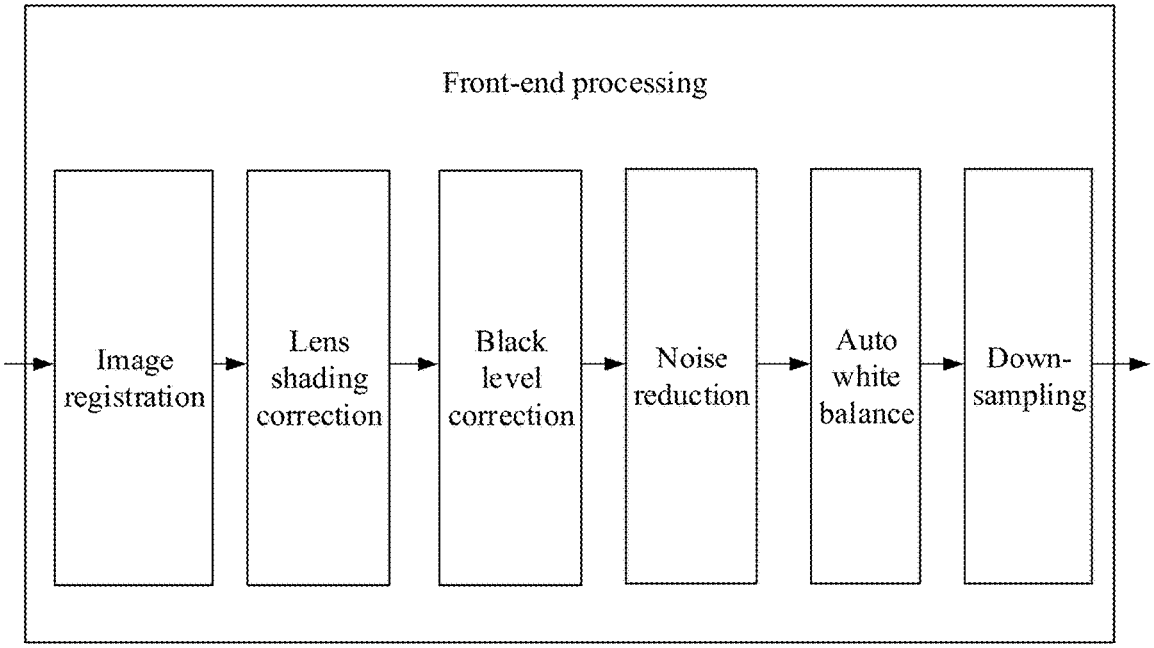
FIG. 6 is a schematic flowchart of front-end processing according to an embodiment of this application.

For example, FIG. 6 is a flowchart of the front-end processing according to this embodiment of this application. As shown in FIG. 6, the front-end processing provided in this embodiment of this application sequentially includes: the image registration, the lens shading correction, the black level correction, the noise reduction, the auto white balance, and the down-sampling. Quality is improved after the front-end processing is performed on the plurality of frames of exposure images.

It should be further understood that after the front-end processing, formats of a plurality of frames of obtained exposure images are the same as those of the plurality of frames of exposure images. For example, when the plurality of frames of exposure images are all Bayer images, the plurality of frames of exposure images obtained through the front-end processing are still Bayer images, namely, images in the RAW domain.

S130: Perform frame color determining on the plurality of frames of front-end images, to determine whether colors of the plurality of frames of front-end images are the same.

Optionally, in an implementation, when the frame color determining is performed on the plurality of frames of front-end images, the determining may be performed not in sequence. For example, one frame of front-end image may be selected as a reference frame from the plurality of frames of front-end images, and then remaining frames of front-end images are separately compared with the reference frame to determine whether a color of each frame of front-end image other than the reference frame is the same as a color of the reference frame.

In this embodiment of this application, as shown in (b) in FIG. 4, for example, if eight frames of exposure images are captured, and eight frames of front-end images are correspondingly obtained through front-end processing, starting from the third frame of front-end image, exposure values corresponding to the third frame of front-end image to the eighth frame of front-end image are all 0 EV. Therefore, the third frame of front-end image, namely, the first frame with the exposure value of 0 EV, may be selected as the reference frame. Then, the remaining seven frames of front-end images are separately compared with the reference frame one by one to determine whether colors are the same.

Optionally, in another implementation, when the frame color determining is performed on the plurality of frames of front-end images, whether a color of an $i^{th}$ frame is the same as that of each frame of front-end image in subsequent images may be determined in sequence, where i is greater than or equal to 1. i is increased by 1 after each time of cyclic determining.

For example, if eight frames of front-end images are obtained after the processing, when frame color determining is performed on the eight frames of front-end images, a process of the first cycle may be as follows: Using the first frame of front-end image as a reference, it is first determined whether colors of the first frame of front-end image and the second frame of front-end image are the same, and then determined whether colors of the first frame of front-end image and the third frame of front-end image are the same. The rest can be deduced by analogy until it is determined whether colors of the first frame of front-end image and the eighth frame of front-end image are the same.

A process of the second cycle may be as follows: Using the second frame of front-end image as a reference, it is first determined whether colors of the second frame of front-end image and the third frame of front-end image are the same, and then determined whether colors of the second frame of front-end image and the fourth frame of front-end image are the same. The rest can be deduced by analogy until it is determined whether colors of the second frame of front-end image and the eighth frame of front-end image are the same. Other cycles are deduced by analogy until it is determined whether colors of the seventh frame of front-end image is the same as the eighth frame of front-end image. A process thereof is not described herein.

Optionally, in still another implementation, when the frame color determining is performed on the plurality of frames of front-end images, the determining may be performed in a preset sequence. For example, every two adjacent frames of front-end images in the plurality of frames of front-end images may be grouped to determine whether colors of the two frames of front-end images included in each group are the same.

It should be understood that a comparison sequence for the frame color determining provided in this embodiment of this application may be set and modified as required. This is not limited in this embodiment of this application.

With reference to the foregoing several examples, regardless of the determining sequence for the frame color determining of the plurality of frames of front-end images, colors of two selected frames of front-end images need to be compared during each time of determining. For this, FIG. 7A and FIG. 7B are a schematic flowchart of two manners of performing color comparison on two frames of front-end images according to this embodiment of this application.

Figure 7A:
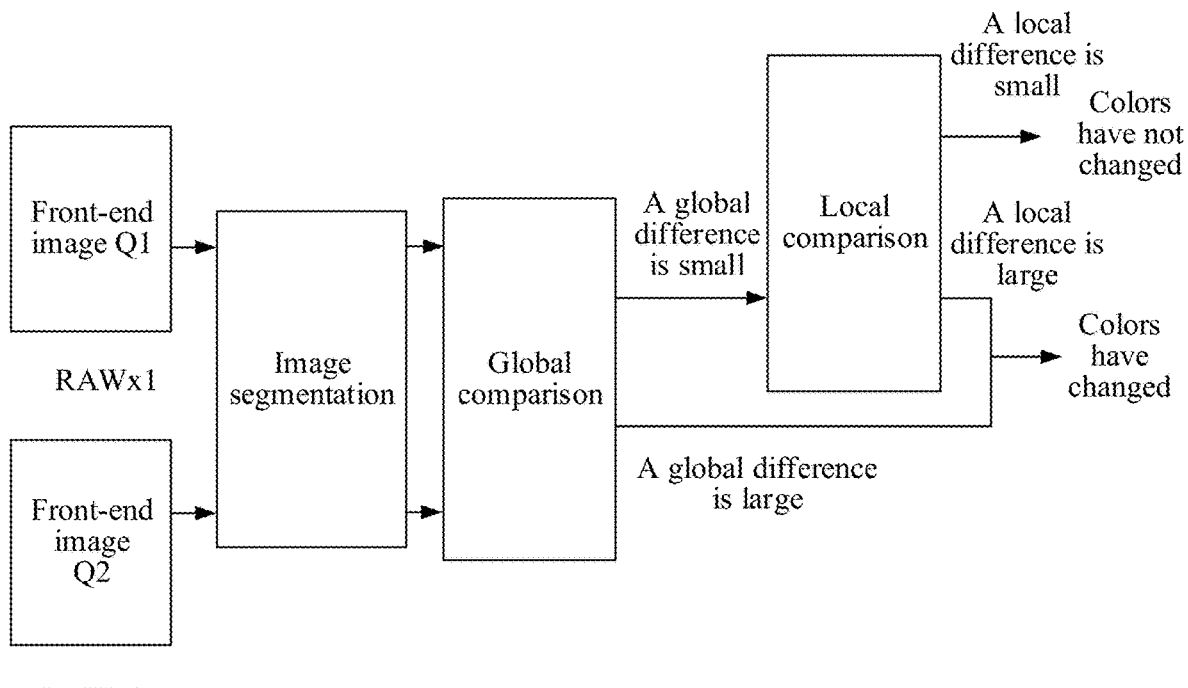
FIG. 7A and FIG. 7B are a schematic flowchart of color comparison between two frames of front-end images according to an embodiment of this application.
Figure 7B:
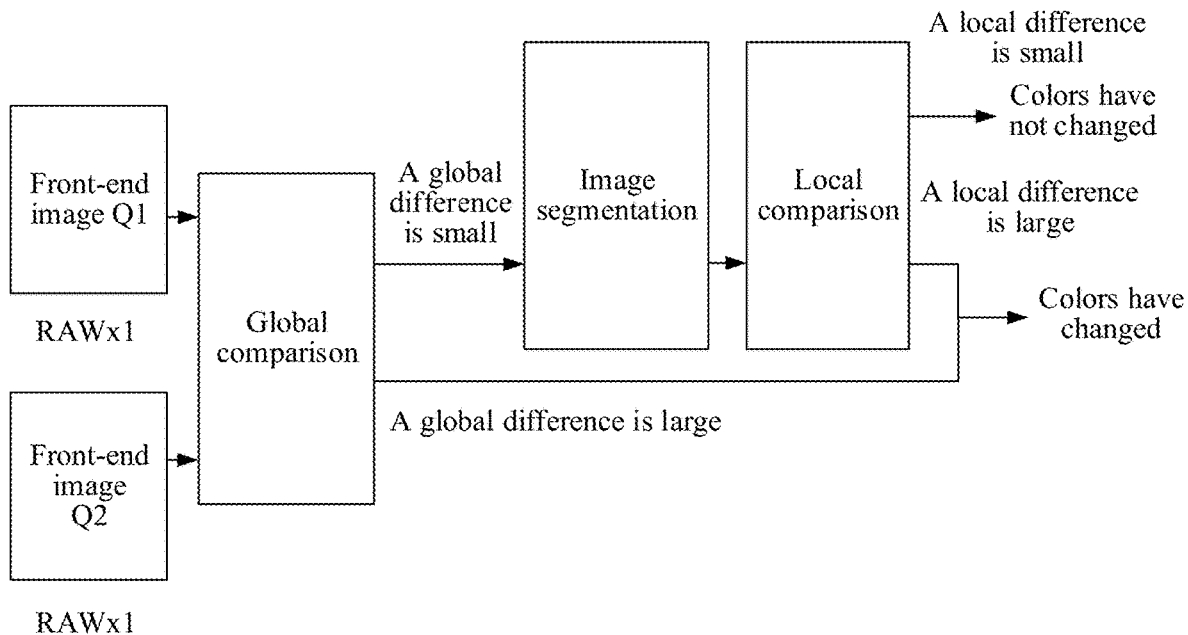

Optionally, as shown in FIG. 7A, when it is determined whether colors of any two frames of front-end images are the same, the following steps S131 to S134 may be performed for the determining:

S131: Perform image segmentation on a front-end image Q1 and a front-end image Q2.

The image segmentation refers to a process of segmenting an image into several specific regions. For example, the segmentation may be performed by pixels, content, or the like, and a specific segmentation manner may be selected as required. This is not limited in this embodiment of this application.

S132: Perform global comparison between the front-end image Q1 and the front-end image Q2, to determine whether global colors, namely, overall colors, of the front-end image Q1 and the front-end image Q2 are the same.

It should be understood that the global comparison indicates: comparing information that is in the two frames of front-end images and that represents respective overall color statuses.

Herein, the information that can represent the overall color status of the front-end image may be: an average value of pixel average values of a same color that correspond to the regions in the front-end image or an average value of pixel modes of a same color that correspond to the regions in the front-end image. Certainly, the foregoing is merely two examples, and the information that can represent the overall color status of the front-end image may alternatively be other information, for example, an average value of pixel medians of a same color that correspond to the regions in the front-end image or an average value of pixel variances of a same color that correspond to the regions in the front-end image. Specific information may be selected as required. This is not limited in this embodiment of this application.

The information that is of the front-end image Q1 and the front-end image Q2 and that represents the respective overall color statuses is compared. If a difference between the two pieces of information is large (for example, values of the two pieces of information are different), it may be considered that a global difference between the front-end image Q1 and the front-end image Q2 is large. If a difference between the two pieces of information is small (for example, values of the two pieces of information are the same), it may be considered that a global difference between the front-end image Q1 and the front-end image Q2 is small.

A magnitude of the difference between the information that is of the two images and that represents the respective overall color statuses may alternatively be determined in another manner. For example, it may be determined whether a difference between the two pieces of information is greater than a corresponding preset threshold; and if yes, it may be considered that the global difference between the front-end image Q1 and the front-end image Q2 is large; or if no, it may be considered that the global difference between the front-end image Q1 and the front-end image Q2 is small.

Alternatively, it may be determined whether a ratio between the two pieces of information is greater than a corresponding preset threshold; and if yes, it may be considered that the global difference between the front-end image Q1 and the front-end image Q2 is large; or if no, it may be considered that the global difference between the front-end image Q1 and the front-end image Q2 is small.

Alternatively, the front-end image Q1 and the front-end image Q2 may be input into the convolutional neural network model (convolutional neural networks, CNN) for comparison, and whether overall colors of the front-end image Q1 and the front-end image Q2 have changed is determined by using an algorithm. The convolutional neural network model may be, for example, YOLO v3, or certainly, may be another model, and may be selected and modified as required. This is not limited in this embodiment of this application.

It should be understood that the foregoing is merely several examples. The magnitude of the global difference may alternatively be determined in another manner in the global comparison. This is not limited in this embodiment of this application.

S133: After the global comparison, if the global difference between the two frames of front-end images is large, determine that the colors of the two frames of front-end images have changed. If the global difference between the two frames of front-end images is small, local comparison may be further performed to determine whether local colors in a same region of the front-end image Q1 and the front-end image Q2 are the same.

S134: If a local difference is small, determine that the colors of the two frames of front-end images have not changed. If the local difference is large, it may be determined that the colors of the two frames of front-end images have changed.

It should be understood that the local comparison indicates: comparing sub-information that is in a same region of the two frames of front-end images and that represents respective regional color statuses.

Herein, the sub-information that can represent the regional color status of the front-end image may be: a pixel average value that is of a same color and that corresponds to each region in the front-end image or a pixel mode that is of a same color and that corresponds to each region in the front-end image. Certainly, the foregoing is merely two examples, and the sub-information that can represent the regional color status of the front-end image may alternatively be other information, for example, a pixel median that is of a same color and that corresponds to each region in the front-end image or a pixel variance that is of a same color and that corresponds to each region in the front-end image. Specific sub-information may be selected as required. This is not limited in this embodiment of this application.

The sub-information that is in the same region of the front-end image Q1 and the front-end image Q2 and that represents the regional color statuses is compared. If a difference between the two pieces of sub-information is large (for example, values of the two pieces of sub-information are different), it may be considered that the local difference that is between the front-end image Q1 and the front-end image Q2 and that is in the region is large. If a difference between the two pieces of sub-information is small (for example, values of the two pieces of sub-information are the same), it may be considered that the local difference that is between the front-end image Q1 and the front-end image Q2 and that is in the region is small.

The difference between the sub-information that is in the same region of the two images and that represents the regional color statuses may alternatively be determined in another manner. For example, it may be determined whether a difference between the two pieces of sub-information is greater than a corresponding preset threshold; and if yes, it may be considered that the local difference that is between the front-end image Q1 and the front-end image Q2 and that is in the region is large; or if no, it may be considered that the local difference that is between the front-end image Q1 and the front-end image Q2 and that is in the region is small.

Alternatively, it may be determined whether a ratio between the two pieces of sub-information is greater than a corresponding preset threshold; and if yes, it may be considered that the local difference that is between the front-end image Q1 and the front-end image Q2 and that is in the region is large; or if no, it may be considered that the local difference that is between the front-end image Q1 and the front-end image Q2 and that is in the region is small.

Alternatively, image blocks in a same region that correspond to the front-end image Q1 and the front-end image Q2 may be input into the CNN for comparison, and whether local colors in the region that are of the front-end image Q1 and the front-end image Q2 are the same is determined by using an algorithm.

It should be understood that the foregoing is merely some examples. A magnitude of the difference between the local regions may alternatively be determined in another manner in the local comparison. The manner of determining the magnitude of the local difference in the local comparison may be the same as or different from the manner of determining the magnitude of the global difference in the global comparison. This is not limited in this embodiment of this application.

It should be understood that the global comparison is comparing the information that represents the overall color statuses of the images, and reflects average color statuses of the images. During this period, it is possible to eliminate some large or small pixel values and cover up some abrupt local colors. Therefore, when it is determined through the global comparison that the global difference between the two frames of front-end images is small and the overall colors are similar, it is further necessary to compare the local colors in the two frames of front-end images to more accurately determine whether the image color has changed. Only when both the global difference and the local difference between the two frames of front-end images are small, is it determined that the colors of the two frames of front-end images are similar and have not changed; otherwise, it is considered that the colors of the two frames of front-end images have changed.

Figure 8:
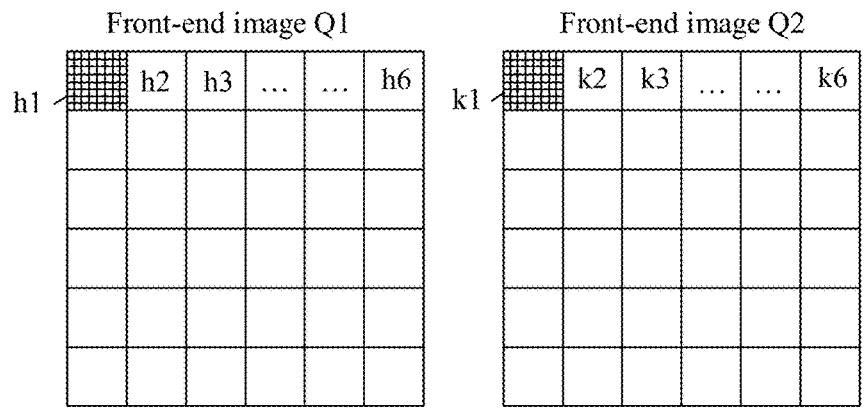
FIG. 8 is a schematic diagram of image segmentation according to an embodiment of this application.

For example, FIG. 8 is a schematic diagram of image segmentation. As shown in FIG. 8, both the front-end image Q1 and the front-end image Q2 are Bayer images, and image segmentation may be performed on the front-end image Q1 in a manner of 8×8 pixel blocks (blocks), to generate a plurality of first image blocks, for example, h1 and h2 respectively. It may be understood that h1, h2, and the like all include 8×8 pixels. In addition, the image segmentation is performed on the front-end image Q2 in the manner of 8×8 pixel blocks, to generate a plurality of second image blocks, for example, k1 and k2 respectively. It may be understood that k1, k2, and the like all include 8×8 pixels. Then, the global comparison is performed on the front-end image Q1 and the front-end image Q2. When the global difference is small, local comparison is sequentially performed on a first image block and a second image block in a same region (in a same row and same column) to continue to determine whether colors of each group of the first image block and the second image block in the same region are similar. Then, it is determined according to a local comparison result whether the colors of the front-end image Q1 and the front-end image Q2 have changed.

It should be understood that the front-end image Q1 and the front-end image Q2 have the same size, and are segmented in a same image segmentation manner; and same quantities of first image blocks and second image blocks are generated, where the first image block and the second image block have a same size.

As shown in FIG. 7A and FIG. 8, when the global comparison and the local comparison are performed on the front-end image Q1 and the front-end image Q2 after the image segmentation, for the front-end image Q1, a pixel average value that is of each color and that corresponds to each first image block is determined first. This may be understood as determining an average value of all pixel values of a first color, an average value of all pixel values of a second color, and the like in the first image block. Then, an average value of the pixel average values of the same color in all the first image blocks is determined. This may be understood as determining an average value of the pixel average values of the first color in all the first image blocks, an average value of the pixel average values of the second color in all the first image blocks, and the like. The average value of the pixel average values of the same color in all the first image blocks is the information that represents the overall color status of the front-end image Q1.

For the front-end image Q2, a pixel average value that is of each color and that corresponds to each second image block is determined first. This may be understood as determining an average value of all pixel values of a first color, an average value of all pixel values of a second color, and the like in the second image block. Then, an average value of the pixel average values of the same color in all the second image blocks is determined. This may be understood as determining an average value of the pixel average values of the first color in all the second image blocks, an average value of the pixel average values of the second color in all the second image blocks, and the like. The average value of the pixel average values of the same color in all the second image blocks is the information that represents the overall color status of the front-end image Q2.

Then, for the first color, it is determined whether a difference between the average value of the pixel average values of the first color that correspond to all the first image blocks and the average value of the pixel average values of the first color that correspond to all the second image blocks is less than a first preset average value threshold corresponding to the first color. A case of another color can be deduced by analogy, and details are not described herein. If a difference calculated for each color is less than a corresponding first preset average value threshold, it indicates that the global difference is small when the global comparison is performed between the front-end image Q1 and the front-end image Q2. This may be considered as that the overall colors of the two frames of front-end images are basically the same. In this case, the local comparison needs to be further performed. If a difference calculated for any color does not meet the foregoing condition, it indicates that the global difference is large when the global comparison is performed between the front-end image Q1 and the front-end image Q2. This may be considered as that the overall colors of the two frames of front-end images are different. In this case, it may be considered that the colors of the two frames of front-end images have changed.

When the global difference is small, in other words, when the overall colors of the two frames of front-end images are basically the same, local comparison is performed between the first image block h1 in the first row and first column of the front-end image Q1 and the second image block k1 in the first row and first column of the front-end image Q2 to determine whether colors of the first image block h1 and the second image block k1 are similar. If the colors are similar, local comparison continues to be performed between the first image block h2 in the first row and second column of the front-end image Q2 and the second image block k2 in the first row and second column of the front-end image Q2 to determine whether colors of the first image block h2 and the second image block k2 are similar. The rest can be deduced by analogy, and details are not described herein. The pixel average value of the same color in the first image block is the sub-information that represents the color status in the first image block of the front-end image Q1. The pixel average value of the same color in the second image block is the sub-information that represents the color status in the second image block of the front-end image Q2.

Then, for the first image block h1 and the second image block k1, it may be determined whether a difference between the pixel average value of the first color in the first image block h1 and the pixel average value of the first color in the second image block k1 is less than a second preset average value threshold corresponding to the first color. A case of another color can be deduced by analogy, and details are not described herein. If a difference calculated for each color is less than a corresponding second preset average value threshold, it indicates that a local difference is small when the local comparison is performed between the first image block h1 and the second image block k1. This may be considered as that the colors of the two image blocks are basically the same. In this case, local comparison may continue to be performed on image blocks in a next region. If a difference calculated for any color does not meet the foregoing condition, it indicates that a local difference is large when the local comparison is performed between the first image block h1 and the second image block k1. This may be considered as that the colors of the two image blocks are different. In this case, it may be considered that the colors of the two frames of front-end images have changed.

On the basis of steps S131 to S134, when it is determined whether colors of any two frames of front-end images are the same, the front-end image Q1 and the front-end image Q2 may be down-sampled before the image segmentation is performed on the front-end image Q1 and the front-end image Q2, to reduce sizes of the images, reduce data amounts generated during the global comparison and the local comparison, and improve processing efficiency.

Optionally, as shown in FIG. 7B, when it is determined whether colors of any two frames of front-end images are the same, steps S135 to S137 may alternatively be performed for the determining:

S135: Perform global comparison between a front-end image Q1 and a front-end image Q2, to determine whether global colors, namely, overall colors, of the front-end image Q1 and the front-end image Q2 are the same.

Optionally, in an implementation, a pixel average value that is of each color and that corresponds to the whole front-end image Q1 and a pixel average value that is of each color and that corresponds to the whole front-end image Q2 may be determined first, and then it is determined whether a difference between two pixel average values corresponding to a same color in two groups of pixel average values is less than a preset global average value threshold corresponding to the same color. The pixel average value of each color indicates: an average value of pixel values of all pixels of each color.

If a difference between two pixel average values corresponding to each color is less than a preset global average value threshold corresponding to the same color, it indicates that a global difference is small when the global comparison is performed between the front-end image Q1 and the front-end image Q2. This may be considered as that the overall colors of the two frames of front-end images are basically the same.

If a difference between two pixel average values corresponding to any color is greater than or equal to a preset global average value threshold corresponding to the same color, it indicates that a global difference is large when the global comparison is performed between the front-end image Q1 and the front-end image Q2. This may be considered as that the overall colors of the two frames of front-end images are different. Herein, the difference, between two pixel average values corresponding to each color, that is greater than or equal to the preset global average value threshold corresponding to the same color and that is determined according to the pixel average value that is of each color and that corresponds to the whole front-end image Q1 and the pixel average value that is of each color and that corresponds to the whole front-end image Q2 is the global difference between the front-end image Q1 and the front-end image Q2.

For example, the front-end image Q1 and the front-end image Q2 both include a red pixel, a green pixel, and a blue pixel. The pixel average value that is of each color and that corresponds to the whole front-end image Q1 includes: a first red pixel average value Q1_R' that represents an average value of all red pixels in the whole front-end image Q1, a first green pixel average value Q1_G' that represents an average value of all green pixels in the whole front-end image Q1, and a first blue pixel average value Q1_B' that represents an average value of all blue pixels in the whole front-end image Q1.

The pixel average value that is of each color and that corresponds to the whole front-end image Q2 includes: a second red pixel average value Q2_R' that represents an average value of all red pixels in the whole front-end image Q2, a second green pixel average value Q2_G' that represents an average value of all green pixels in the whole front-end image Q2, and a second blue pixel average value Q2_B' that represents an average value of all blue pixels in the whole front-end image Q2.

If a difference between the first red pixel average value Q1_R' and the second red pixel average value Q2_R' is less than a preset global average value threshold corresponding to the red color, a difference between the first green pixel average value Q1_G' and the second green pixel average value Q2_G' is less than a preset global average value threshold corresponding to the green color, and a difference between the first blue pixel average value Q1_B' and the second blue pixel average value Q2_B' is less than a preset global average value threshold corresponding to the blue color, it indicates that the global difference is small when the global comparison is performed between the front-end image Q1 and the front-end image Q2, and it is considered that the overall colors of the two frames of front-end images are basically the same. All other cases indicate that the global difference is large when the global comparison is performed between the front-end image Q1 and the front-end image Q2, and it is considered that the overall colors of the two frames of front-end images are different.

Herein, a determined difference that is between the first red pixel average value Q1_R' and the second red pixel average value Q2_R' and that is greater than or equal to the preset global average value threshold corresponding to the red color, a determined difference that is between the first green pixel average value Q1_G' and the second green pixel average value Q2_G' and that is greater than or equal to the preset global average value threshold corresponding to the green color, and a determined difference that is between the first blue pixel average value Q1_B' and the second blue pixel average value Q2_B' and that is greater than or equal to the preset global average value threshold corresponding to the blue color are the global difference between the front-end image Q1 and the front-end image Q2.

Optionally, in another implementation, a pixel mode that is of each color and that corresponds to the whole front-end image Q1 and a pixel mode that is of each color and that corresponds to the whole front-end image Q2 may be determined first, and then it is determined whether a difference between two modes corresponding to a same color in two groups of modes is less than a preset global mode threshold corresponding to the same color. The pixel mode of each color indicates: a pixel value that appears the most among all pixels of each color.

If a difference between two modes corresponding to each color is less than a preset global mode threshold corresponding to the same color, it indicates that the global difference is small when the global comparison is performed between the front-end image Q1 and the front-end image Q2, and it may be considered that the overall colors of the two frames of front-end images are basically the same.

If a difference between two modes corresponding to any color is greater than or equal to a preset global mode threshold corresponding to the same color, it indicates that the global difference is large when the global comparison is performed between the front-end image Q1 and the front-end image Q2, and it may be considered that the overall colors of the two frames of front-end images are different. Herein, a difference, between two modes corresponding to each color, that is greater than or equal to a preset global mode threshold corresponding to the same color and that is determined according to the pixel mode that is of each color and that corresponds to the whole front-end image Q1 and the pixel mode that is of each color and that corresponds to the whole front-end image Q2 is the global difference between the front-end image Q1 and the front-end image Q2.

For example, the front-end image Q1 and the front-end image Q2 both include a red pixel, a green pixel, and a blue pixel. The pixel mode that is of each color and that corresponds to the whole front-end image Q1 includes: a first red mode Q1_R" that represents a pixel value that appears the most in all red pixels in the whole front-end image Q1, a first green mode Q1_G" that represents a pixel value that appears the most in all green pixels in the whole front-end image Q1, and a first blue mode Q1_B" that represents a pixel value that appears the most in all blue pixels in the whole front-end image Q1.

The pixel mode that is of each color and that corresponds to the whole front-end image Q2 includes: a second red mode Q2_R" that represents a pixel value that appears the most in all red pixels in the whole front-end image Q2, a second green mode Q2_G" that represents a pixel value that appears the most in all green pixels in the whole front-end image Q2, and a second blue mode Q2_B" that represents a pixel value that appears the most in all blue pixels in the whole front-end image Q2.

If a difference between the first red mode Q1_R" and the second red mode Q2_R" is less than a preset global mode threshold corresponding to the red color, a difference between the first green mode Q1_G" and the second green mode Q2_G" is less than a preset global mode threshold corresponding to the green color, and a difference between the first blue mode Q1_B" and the second blue mode Q2_B" is less than a preset global mode threshold corresponding to the blue color, it indicates that the global difference is small when the global comparison is performed between the front-end image Q1 and the front-end image Q2, and it is considered that the overall colors of the two frames of front-end images are basically the same. All other cases indicate that the global difference is large when the global comparison is performed between the front-end image Q1 and the front-end image Q2, and it is considered that the overall colors of the two frames of front-end images are different.

Herein, a determined difference that is between the first red mode Q1_R" and the second red mode Q2_R" and that is greater than or equal to the preset global mode threshold corresponding to the red color, a determined difference that is between the first green mode Q1_G" and the second green mode Q2_G" and that is greater than or equal to the preset global mode threshold corresponding to the green color, and a determined difference that is between the first blue mode Q1_B" and the second blue mode Q2_B" and that is greater than or equal to the preset global mode threshold corresponding to the blue color are the global difference between the front-end image Q1 and the front-end image Q2.

It should be understood that the front-end image may alternatively include pixels of a plurality of other colors, and the foregoing is merely an example. A color type and a quantity of colors are not limited in this embodiment of this application.

S136: After the global comparison, if the global difference between the two frames of front-end images is large, determine that the colors of the two frames of front-end images have changed. If the global difference between the two frames of front-end images is small, image segmentation and local comparison may be further performed to determine whether local colors at a same position in the front-end image Q1 and the front-end image Q2 are the same.

S137: If a local difference is small, determine that the colors of the two frames of front-end images have not changed. If the local difference is large, it may be determined that the colors of the two frames of front-end images have changed.

For example, as shown in FIG. 8, both the front-end image Q1 and the front-end image Q2 are Bayer images, and the global comparison may be performed between the front-end image Q1 and the front-end image Q2 in any schematic manner in S135. If the global difference between the two frames of front-end images is large, it may be considered that the colors of the two frames of front-end images have changed. If the global difference is small, the image segmentation is performed on the front-end image Q1 in a manner of 8×8 pixel blocks (blocks), to generate a plurality of first image blocks, for example, h1 and h2 respectively. It may be understood that h1, h2, and the like all include 8×8 pixels. In addition, the image segmentation is performed on the front-end image Q2 in the manner of 8×8 pixel blocks, to generate a plurality of second image blocks, for example, k1 and k2 respectively. It may be understood that k1, k2, and the like all include 8×8 pixels. Based on this, the local comparison is sequentially performed on a first image block and a second image block in a same region (in a same row and same column) to continue to determine whether colors of each group of the first image block and the second image block in the same region are similar. Then, it is determined according to a local comparison result whether the colors of the front-end image Q1 and the front-end image Q2 have changed.

Optionally, in a first implementation, using an example in which the local comparison is performed between the first image block h1 and the second image block k1, the first image block h1 and the second image block k1 may be compared pixel by pixel, in other words, pixel values of pixels at a same position are sequentially compared. If the pixel values of the pixels at the same position are different, it indicates that colors of the first image block h1 and the second image block k1 have changed. Herein, a difference between the pixel values of the pixels at the same position is a local difference between the first image block h1 and the second image block k1.

Optionally, in a second implementation, using an example in which the local comparison is performed between the first image block h1 and the second image block k1, a pixel difference between the first image block h1 and the second image block k1 may be calculated pixel by pixel. If a difference between two pixels at a same position is greater than a preset difference threshold, it indicates that a pixel difference at the same position is large; otherwise, a difference between the two pixels can be ignored. Herein, a difference that is between pixel values of pixels at a same position and that is greater than a difference threshold is a local difference between the first image block h1 and the second image block k1.

Optionally, in a third implementation, using an example in which local comparison is performed between the first image block h1 and the second image block k1, a pixel ratio of the first image block h1 to the second image block k1 may be calculated pixel by pixel. If a ratio of two pixels at a same position is greater than a preset ratio threshold, it indicates that a pixel difference at the same position is large; otherwise, the difference between the two pixels can be ignored.

On this basis, in the first to third implementations, it may be further set that if a preset proportion of pixels among the 8×8 pixels are different, for example, 65% of the pixels are different or have a large difference, it indicates that the colors of the first image block h1 and the second image block k1 have changed; otherwise, the different pixels can be ignored, and it is considered that the colors of the first image block h1 and the second image block k1 have not changed.

Optionally, in a fourth implementation, using an example in which local comparison is performed between the first image block h1 and the second image block k1, pixel average values of each color that are in the first image block h1 and the second image block k1 may be determined first, and then it is determined whether two pixel average values corresponding to a same color in two groups of pixel average values are the same, or whether a difference between two pixel average values corresponding to a same color is less than a preset local average value threshold corresponding to the same color.

If two pixel average values corresponding to any color are different, or a difference between two pixel average values corresponding to any color is greater than a preset local average value threshold corresponding to the same color, it indicates that the colors of the first image block h1 and the second image block k1 have changed; otherwise, it indicates that the colors of the first image block h1 and the second image block k1 have not changed.

Optionally, in a fifth implementation, using an example in which local comparison is performed between the first image block h1 and the second image block k1, pixel modes of each color that are in the first image block h1 and the second image block k1 may be determined first, and then it is determined whether two pixel modes corresponding to a same color in two groups of pixel modes are the same, or whether a difference between two pixel modes corresponding to a same color is less than a preset local mode threshold corresponding to the same color.

If two pixel modes corresponding to any color are different, or a difference between two modes corresponding to any color is greater than a preset local mode threshold corresponding to the same color, it indicates that the colors of the first image block h1 and the second image block k1 have changed; otherwise, it indicates that the colors of the first image block h1 and the second image block k1 have not changed.

Optionally, in a sixth implementation, using an example in which local comparison is performed between the first image block h1 and the second image block k1, the first image block h1 and the second image block k1 may be directly input into the CNN for color comparison, and whether the colors of the first image block h1 and the second image block k1 have changed may be determined by using an algorithm.

It should be understood that the foregoing is merely several example, and the local comparison may alternatively be set and modified to another comparison manner as required. This is not limited in this embodiment of this application.

S140: If the colors of all the plurality of frames of front-end images are the same, fuse the plurality of frames of front-end images to obtain a target image M1.

Optionally, during the fusion, different weights may be further set for different front-end images correspondingly to adjust influence of different front-end images.

Herein, that the colors of all the plurality of frames of front-end images are the same means: a case in which when determining is performed on any two frames of front-end images in the plurality of frames of front-end images by using the method in S131 to S134 or the method in S135 to S137, a global difference and a local difference corresponding to the two frames of front-end images are small.

Correspondingly, that the colors of the plurality of frames of front-end images are different means: a case in which when determining is performed on at least two frames of front-end images in the plurality of frames of front-end images by using the method in S131 to S134 or the method in S135 to S137, a global difference corresponding to the two frames of front-end images is large; or a global difference corresponding to the two frames of front-end images is small, but a local difference corresponding to the two frames of front-end images is large.

It should be understood that the conditions in the method in S131 to S134 or the method in S135 to S137 are collectively referred to as a second preset condition. When a global difference and a local difference corresponding to two frames of front-end images are small, it is considered that the two frames of front-end images meet the second preset condition; otherwise, it is considered that the two frames of front-end images do not meet the second preset condition.

S150: If the colors of the plurality of frames of front-end images are different, fuse all or a part of the plurality of frames of front-end images according to a preset processing rule corresponding to a frame color determining result, to obtain a target image M2; or determine one frame of front-end image as a target image from the plurality of frames of front-end images.

For example, if only two frames of exposure images are captured, it may be determined, through the foregoing global comparison and local comparison processes, that colors of front-end images corresponding to the two frames of exposure images are the same. In this case, the two frames of front-end images may be fused to obtain a target image. If it is determined that the colors of the front-end images corresponding to the two frames of exposure images are different, a reference frame in the two frames of front-end images may be output as a target image. Alternatively, a front-end image with a smaller exposure value in the two frames of front-end images may be used as a target image.

It should be understood that if three or more frames of exposure images are captured, a sequence and a comparison manner of the frame color determining may be set as required, and a corresponding preset processing rule may also be set and modified as required. This is not limited in this embodiment of this application.

S160: Perform first backend processing on the target image M1 to obtain a backend image H1, or perform second backend processing on the target image M2 to obtain a backend image H2.

Optionally, the first backend processing and the second backend processing may both include: at least one of nonlinear superposition and ghost correction.

The nonlinear superposition means performing nonlinear enhancement on a gamma (gamma) value or a lighting value of the target image, to enlarge a dynamic range (dynamic range, DR) of the target image, in other words, make bright content in the target image brighter and dark content in the target image darker after the processing, so that the image has a stronger expressive force and richer layers.

It should be understood that the first backend processing and the second backend processing are used to repair defects and deficiencies generated in the fusion process. The first backend processing is performed to correct and compensate for the target image M1, and the second backend processing is performed to correct and compensate for the target image M2.

When the first backend processing and the second backend processing include a plurality of the foregoing processing steps, a processing sequence of the plurality of processing steps may be set and adjusted as required. This is not limited in this embodiment of this application. Certainly, the first backend processing and the second backend processing may further include another step. The first backend processing and the second backend processing may include same or different steps, and specific steps may be selected as required. This is not limited in this embodiment of this application.

Figure 9:
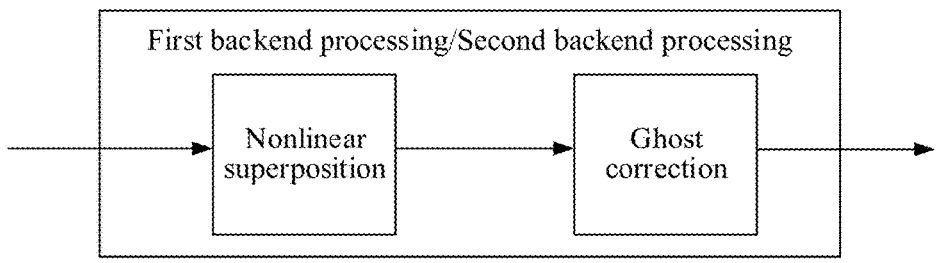
FIG. 9 is a schematic flowchart of backend processing according to an embodiment of this application.

For example, FIG. 9 is a flowchart of the first backend processing or the second backend processing according to this embodiment of this application. As shown in FIG. 9, the first backend processing or the second backend processing provided in this embodiment of this application sequentially includes: the nonlinear superposition and the ghost correction. Quality is improved after the first backend processing is performed on the target image M1, and quality is also improved after the second backend processing is performed on the target image M2.

It should also be understood that a format of the backend image H1 or backend image H2 obtained through the first backend processing or the second backend processing is the same as that of the exposure image. For example, when the plurality of frames of exposure images are the Bayer images, the backend image H1 or the backend image H2 is still a Bayer image, namely, an image in the RAW domain.

This embodiment of this application provides the image processing method, to perform frame color determining on the plurality of frames of exposure images before the fusion. Based on the frame color determining result, all or the part of the exposure images are selected according to the corresponding preset processing rule for the fusion; or the fusion is skipped, and only one frame of exposure images is selected for output. Therefore, according to the image processing method provided in this embodiment of this application, whether the fusion is to be performed can be reasonably determined according to different color statuses of the plurality of frames of exposure images, to obtain the corresponding target image that can most truly reflect the color, improve the quality of the processed image, and avoid color cast that occurs after the plurality of frames of captured images are fused in a scene in which a color of a light source changes.

The image processing method provided in the embodiments of this application is described below in detail with reference to a specific frame color determining process.

Embodiment 1

Figure 10A:
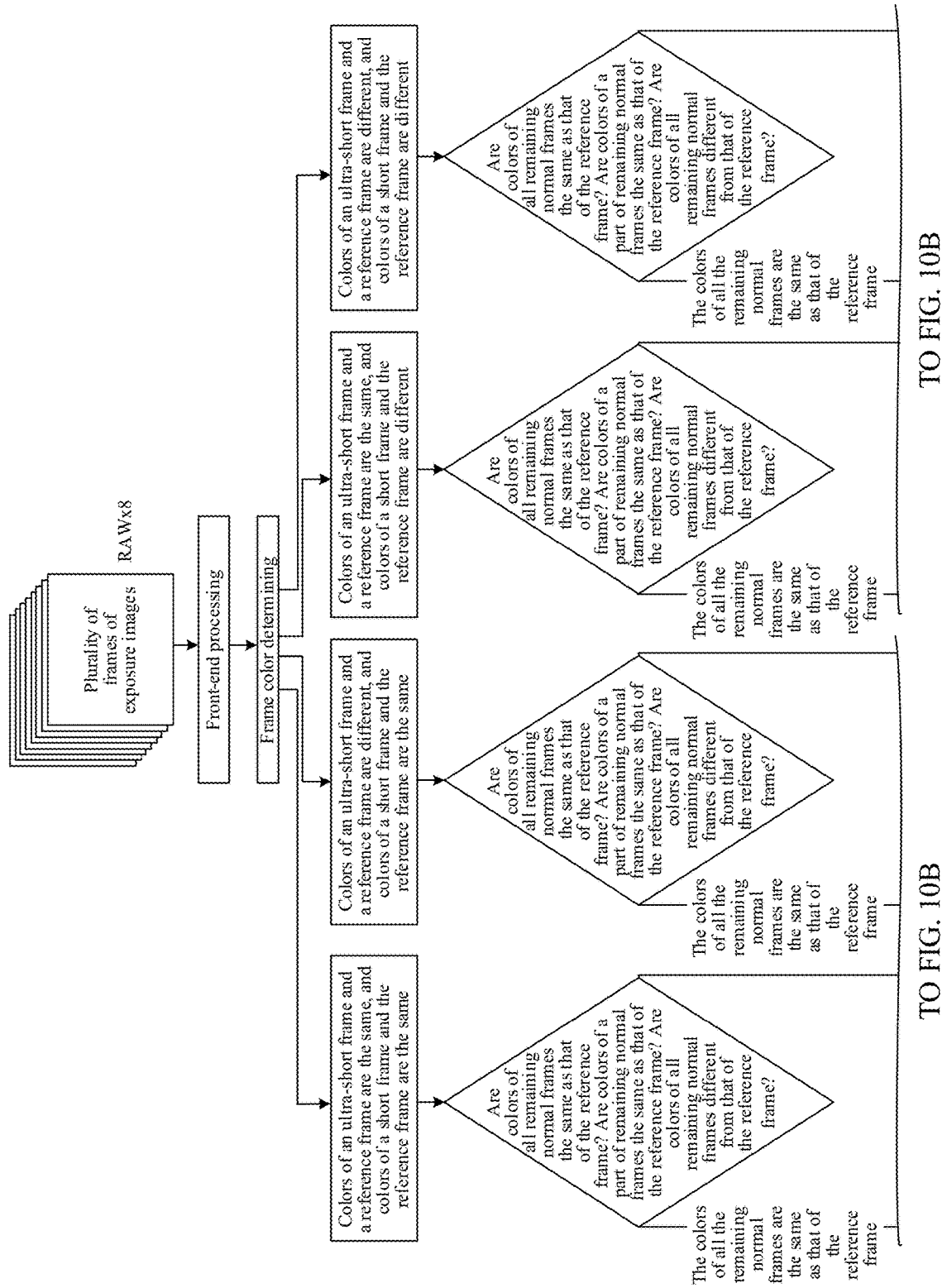
FIG. 10A and FIG. 10B are a schematic flowchart of an image processing method according to an embodiment of this application.
Figure 10B:
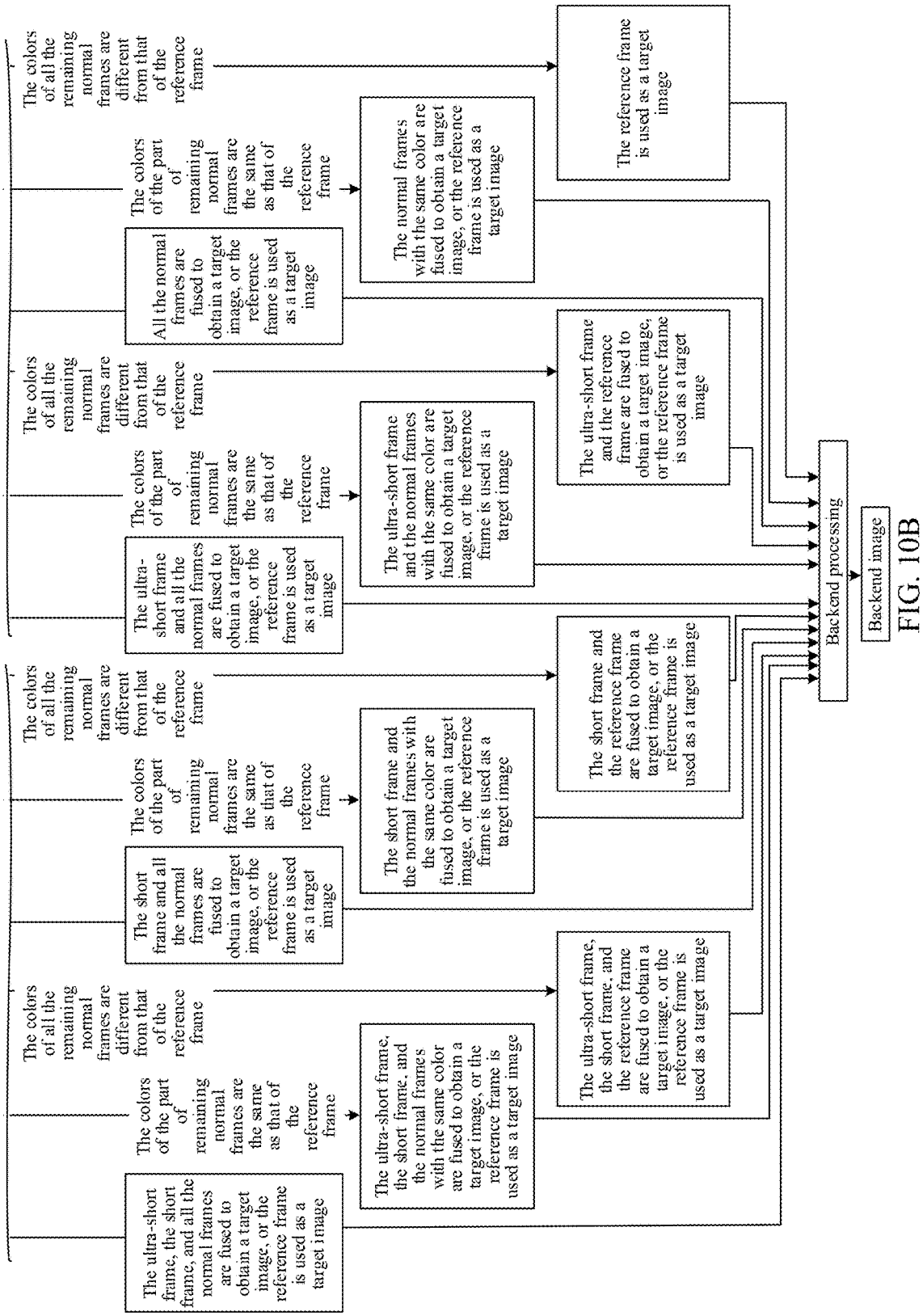

FIG. 10A and FIG. 10B are a flowchart of an image processing method according to an embodiment of this application. As shown in FIG. 10A and FIG. 10B, the image processing method provided in this embodiment of this application may include S210 to S280. These steps are described below in detail.

S210: Obtain a sequence including eight frames of images.

Exposure values of the eight frames of images in the sequence are not totally the same. For example, as shown in (a) in FIG. 4, the exposure values may increase in sequence, and the exposure values of the eight frames of exposure images are all different. The eight frames of exposure images sequentially include one ultra-short frame, one short frame, and six normal frames from left to right. Alternatively, as shown in (b) in FIG. 4, a part of the exposure values are different, and the other part of the exposure values are the same. The eight frames of exposure images sequentially include one ultra-short frame, one short frame, and six normal frames from left to right. Certainly, the exposure values of the eight frames of exposure images may alternatively be in another case. The eight frames of exposure images may alternatively be divided into two ultra-short frames, one short frame, and five normal frames according to preset exposure values. A specific case may be set as required. This is not limited in this embodiment of this application.

Optionally, the eight frames of exposure images are all images in a RAW domain, an RGB domain, or a YUV domain, or may be in other color space. This is not limited in this application. It may be understood that the eight frames are illustrative, and there may be six frames, five frames, nine frames, or another quantity of frames. This is not limited in this application.

S220: Perform front-end processing on the eight frames of exposure images to obtain eight frames of front-end images.

Descriptions of S220 is the same as those of S120, and details are not described herein again.

S230: Perform frame color determining on the eight frames of front-end images.

Using (b) in FIG. 4 as an example, exposure values corresponding to the third frame of front-end image to the eighth frame of front-end image are all 0 EV, and the third frame of front-end image to the eighth frame of front-end image are all referred to as the normal frames. An exposure value corresponding to the second frame of front-end image is −1 EV that is less than a first preset exposure value 0 EV In this case, the second frame of front-end image is referred to as the short frame. An exposure value corresponding to the first frame of front-end image is −3 EV that is less than a second preset exposure value −2 EV In this case, the first frame of front-end image is referred to as the ultra-short frame.

The third frame of front-end image is the first normal frame, and may be selected as a reference frame for comparison to determine whether colors of the ultra-short frame and the reference frame are the same, whether colors of the short frame and the reference frame are the same, and whether colors of the fourth frame of front-end image (the second normal frame) and the reference frame are the same. The rest can be deduced by analogy until it is determined whether colors of the eighth frame of front-end image (the sixth normal frame) and the reference frame are the same.

For the foregoing manner of determining whether colors of two frames of images are the same each time, refer to the manner shown in FIG. 7A. For example, image segmentation is first performed on the two frames of images, and then global comparison is performed. When a global difference between the two frames of images is large, it is determined that the colors of the two frames of images have changed. When a global difference between the two frames of images is small, local comparison is continued. When the global difference and a local difference between the two frames of images are both small, it is determined that the colors of the two frames of images have not changed. Otherwise, although the global difference between the two frames of images is small but the local difference is large, it is still considered that the colors of the two frames of images have changed.

Certainly, for the foregoing manner of determining whether colors of two frames of images are the same each time, refer to the manner shown in FIG. 7B alternatively. This is not limited in this embodiment of this application.

S240: If it is determined, after comparison between the ultra-short frame and the reference frame, that the colors of the ultra-short frame and the reference frame are the same, and it is determined, after comparison between the short frame and the reference frame, that the colors of the short frame and the reference frame are the same, it indicates that the colors of the ultra-short frame, the short frame, and the reference frame are the same.

In this case, if it is determined, after comparison between the remaining normal frames (the second normal frame to the sixth normal frame) and the reference frame one by one, that the colors of the remaining normal frames are the same as that of the reference frame, it indicates that the colors of all the normal frames are the same, and further indicates that the colors of all the eight frames of front-end images are the same and have not changed. In this case, all the eight frames of front-end images may be fused to obtain a target image. Alternatively, only the reference frame may be output as a target image.

If it is determined, after comparison between the remaining normal frames and the reference frame, that only a part of the remaining normal frames have the same color as the reference frame, it indicates that only a part of the six normal frames have the same color, and further indicates that only a part of the eight frames of front-end images have the same color. In this case, the plurality of frames of front-end images (the ultra-short frame, the short frame, the reference frame, and the part of normal frames with the same color as the reference frame in the remaining normal frames) with the same color may be fused to obtain a target image, while the remaining frame with a different color is not fused. Alternatively, only the reference frame may be output as a target image.

If it is determined, after comparison between the remaining normal frames and the reference frame, that each of the remaining normal frames has a different color from the reference frame, it indicates that all the six normal frames have different colors, and further indicates that only the ultra-short frame and the short frame in the eight frames of front-end images have the same color as the reference frame. In this case, the ultra-short frame, the short frame, and the reference frame may be fused to obtain a target image. Alternatively, the reference frame may be output as a target image.

S250: If it is determined, after comparison between the ultra-short frame and the reference frame, that the colors of the ultra-short frame and the reference frame are different, and it is determined, after comparison between the short frame and the reference frame, that the colors of the short frame and the reference frame are the same, it indicates that the colors of the ultra-short frame, the short frame, and the reference frame are not totally the same.

In this case, if it is determined, after comparison between the remaining normal frames (the second normal frame to the sixth normal frame) and the reference frame one by one, that the colors of all the remaining normal frames are the same as that of the reference frame, it indicates that the colors of all the normal frames are the same, and further indicates that the colors of the short frame and all the normal frames are the same and only the color of the ultra-short frame has changed. In this case, the ultra-short frame may be removed, and only the short frame and the six normal frames are fused to obtain a target image. Alternatively, only the reference frame may be output as a target image.

If it is determined, after comparison between the remaining normal frames and the reference frame, that only a part of the remaining normal frames have the same color as the reference frame, it indicates that only a part of the six normal frames have the same color, and further indicates that only a part of the eight frames of front-end images have the same color. In this case, the plurality of frames of front-end images (the short frame, the reference frame, and the part of normal frames with the same color as the reference frame in the remaining normal frames) with the same color may be fused to obtain a target image, while the remaining frame with a different color is not fused. Alternatively, only the reference frame may be output as a target image.

If it is determined, after comparison between the remaining normal frames and the reference frame, that each of the remaining normal frames has a different color from the reference frame, it indicates that all the six normal frames have different colors, and further indicates that only the short frame in the eight frames of front-end images has the same color as the reference frame. In this case, the short frame and the reference frame may be fused to obtain a target image. Alternatively, the reference frame may be output as a target image.

S260: If it is determined, after comparison between the ultra-short frame and the reference frame, that the colors of the ultra-short frame and the reference frame are the same, and it is determined, after comparison between the short frame and the reference frame, that the colors of the short frame and the reference frame are different, it indicates that the colors of the ultra-short frame, the short frame, and the reference frame are not totally the same.

In this case, if it is determined, after comparison between the remaining normal frames (the second normal frame to the sixth normal frame) and the reference frame one by one, that the colors of the remaining normal frames are the same as that of the reference frame, it indicates that the colors of all the normal frames are the same, and further indicates that the colors of the ultra-short frame and all the normal frames are the same and only the color of the short frame has changed. In this case, the short frame may be removed, and only the ultra-short frame and the six normal frames are fused to obtain a target image. Alternatively, only the reference frame may be output as a target image.

If it is determined, after comparison between the remaining normal frames and the reference frame, that only a part of the remaining normal frames have the same color as the reference frame, it indicates that only a part of the six normal frames have the same color, and further indicates that only a part of the eight frames of front-end images have the same color. In this case, the plurality of frames of front-end images (the ultra-short frame, the reference frame, and the part of normal frames with the same color as the reference frame in the remaining normal frames) with the same color may be fused to obtain a target image, while the remaining frame with a different color is not fused. Alternatively, only the reference frame may be output as a target image.

If it is determined, after comparison between the remaining normal frames and the reference frame, that each of the remaining normal frames has a different color from the reference frame, it indicates that all the six normal frames have different colors, and further indicates that only the ultra-short frame in the eight frames of front-end images has the same color as the reference frame. In this case, the ultra-short frame and the reference frame may be fused to obtain a target image. Alternatively, the reference frame may be output as a target image.

S270: If it is determined, after comparison between the ultra-short frame and the reference frame, that the colors of the ultra-short frame and the reference frame are different, and it is determined, after comparison between the short frame and the reference frame, that the colors of the short frame and the reference frame are also different, it indicates that the colors of the ultra-short frame, the short frame, and the reference frame are totally different.

In this case, if it is determined, after comparison between the remaining normal frames (the second normal frame to the sixth normal frame) and the reference frame one by one, that the colors of the remaining normal frames are the same as that of the reference frame, it indicates that the colors of all the normal frames are the same, and further indicates that the colors of only the normal frames are the same and the colors of the ultra-short frame and the short frame have changed. In this case, the ultra-short frame and the short frame may be removed, and only the six normal frames are fused to obtain a target image. Alternatively, only the reference frame may be output as a target image.

If it is determined, after comparison between the remaining normal frames and the reference frame, that only a part of the remaining normal frames have the same color as the reference frame, it indicates that only a part of the six normal frames have the same color, and further indicates that only a part of the eight frames of front-end images have the same color. In this case, the plurality of frames of front-end images (the reference frame and the part of normal frames with the same color as the reference frame in the remaining normal frames) with the same color may be fused to obtain a target image, while the remaining frame with a different color is not fused. Alternatively, only the reference frame may be output as a target image.

If it is determined, after comparison between the remaining normal frames and the reference frame, that each of the remaining normal frames has a different color from the reference frame, it indicates that all the six normal frames have different colors, and further indicates that the remaining front-end images in the eight frames of front-end images all have different colors from the reference frame. In this case, only the reference frame may be output as a target image.

It should be understood that S240 to S270 are different preset processing rules corresponding to different results obtained through the frame color determining.

It should be understood that in S240 to S270, because the colors of a part of the remaining seven frames of front-end images have changed relative to the reference frame, it is necessary to remove the front-end image with a changed color during the fusion, and only the front-end images with unchanged colors are fused. In this case, the colors are unified, so that the obtained target image is not disturbed by various colors, and a color of the generated target image is not distorted. In this way, the color of the target image can be corrected, and quality of the target image can be improved.

S280: Perform backend processing on the target image to obtain a backend image.

It should be understood that descriptions of the backend processing are the same as those of S150. Details are not described herein again.

It should be understood that the foregoing is merely an example of the image processing method provided in the embodiments of this application. In another embodiment, a sequence of a part of steps in the method may be changed according to an actual need, or a part of steps may be omitted or deleted. This is not limited in the embodiments of this application.

Embodiment 2

Figure 11A:
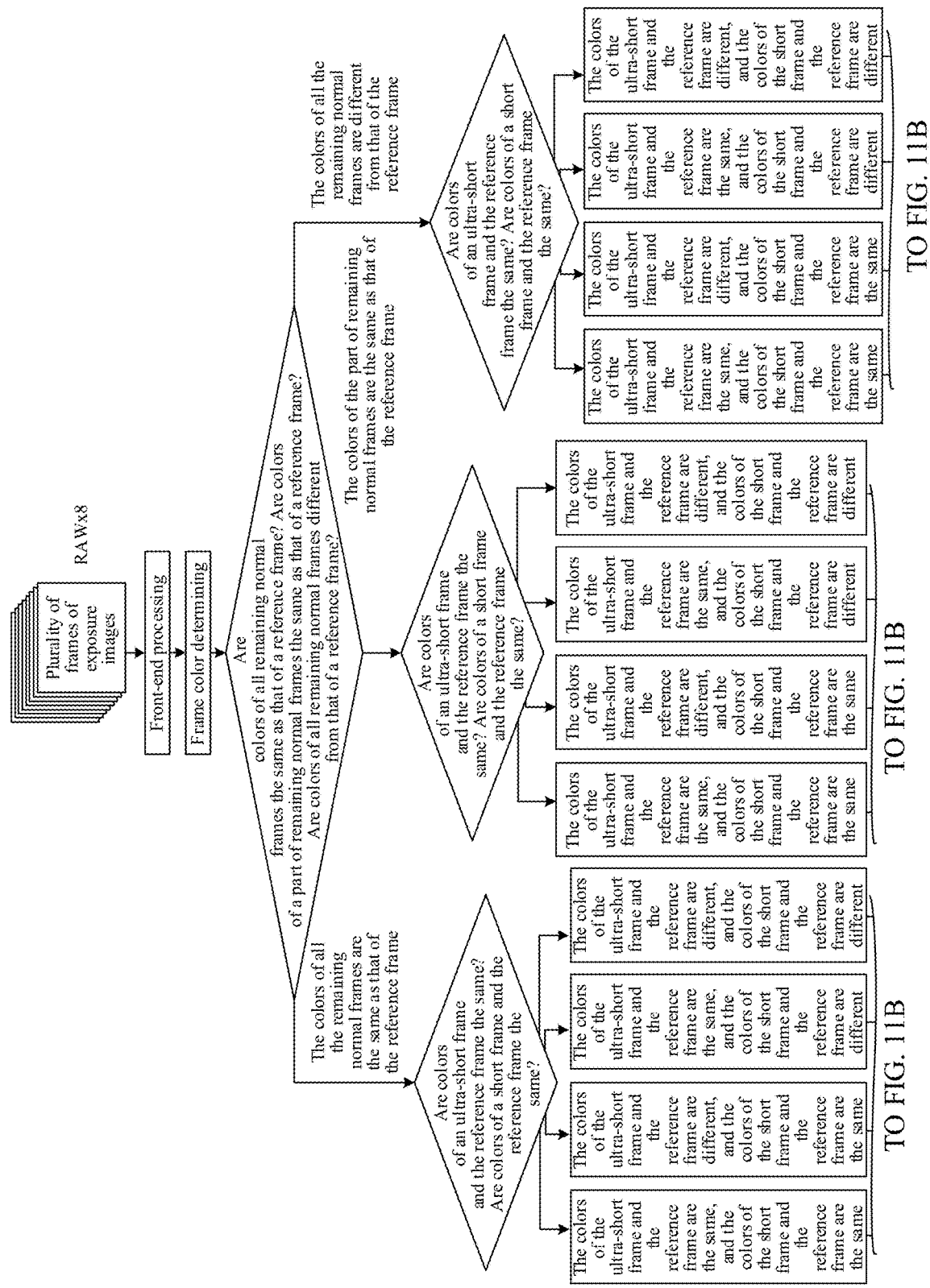

FIG. 11A and FIG. 11B are a flowchart of an image processing method according to an embodiment of this application. As shown in FIG. 11A and FIG. 11B, the image processing method provided in this embodiment of this application may include S310 to S370. These steps are described below in detail.

S310: Obtain a sequence including eight frames of images.

Exposure values of the eight frames of images in the sequence are not totally the same. For example, as shown in (a) in FIG. 4, the exposure values may increase in sequence, and the exposure values of the eight frames of exposure images are all different. The eight frames of exposure images sequentially include one ultra-short frame, one short frame, and six normal frames from left to right. Alternatively, as shown in (b) in FIG. 4, a part of the exposure values are different, and the other part of the exposure values are the same. The eight frames of exposure images sequentially include one ultra-short frame, one short frame, and six normal frames from left to right. Certainly, the exposure values of the eight frames of exposure images may alternatively be in another case. The eight frames of exposure images may alternatively be divided into two ultra-short frames, one short frame, and five normal frames according to preset exposure values. A specific case may be set as required. This is not limited in this embodiment of this application.

Optionally, the eight frames of exposure images are all images in a RAW domain, an RGB domain, or a YUV domain, or may be in other color space. This is not limited in this application. Herein, only the image in the RAW domain is used as an example for illustration. It may be understood that the eight frames are illustrative, and there may be six frames, five frames, nine frames, or another quantity of frames. This is not limited in this application.

S320: Perform front-end processing on the eight frames of exposure images to obtain eight frames of front-end images.

Descriptions of S320 is the same as those of S120, and details are not described herein again.

S330: Perform frame color determining on the eight frames of front-end images.

Using (b) in FIG. 4 as an example, exposure values corresponding to the third frame of front-end image to the eighth frame of front-end image are all 0 EV, and the third frame of front-end image to the eighth frame of front-end image are all referred to as the normal frames. An exposure value corresponding to the second frame of front-end image is −1 EV that is less than a first preset exposure value 0 EV. In this case, the second frame of front-end image is referred to as the short frame. An exposure value corresponding to the first frame of front-end image is −3 EV that is less than a second preset exposure value −2 EV In this case, the first frame of front-end image is referred to as the ultra-short frame.

The third frame of front-end image is the first normal frame, and may be selected as a reference frame for comparison to determine whether colors of the ultra-short frame and the reference frame are the same, whether colors of the short frame and the reference frame are the same, and whether colors of the fourth frame of front-end image (the second normal frame) and the reference frame are the same. The rest can be deduced by analogy until it is determined whether colors of the eighth frame of front-end image (the sixth normal frame) and the reference frame are the same.

For the foregoing manner of determining whether colors of two frames of images are the same each time, refer to the manner shown in FIG. 7A or the manner shown in FIG. 7B. This is not limited in this embodiment of this application.

S340: If it is determined, after comparison between the remaining normal frames (the second normal frame to the sixth normal frame) and the reference frame one by one, that the colors of the remaining normal frames are the same as that of the reference frame, it indicates that the colors of all the normal frames are the same.

In this case, if it is determined, after comparison between the ultra-short frame and the reference frame, that the colors of the ultra-short frame and the reference frame are the same, and it is determined, after comparison between the short frame and the reference frame, that the colors of the short frame and the reference frame are also the same, it indicates that the colors of the ultra-short frame, the short frame, and the reference frame are the same, and further indicates that the colors of all the eight frames of front-end images are the same and have not changed. Then, all the eight frames of front-end images may be fused to obtain a target image. Alternatively, only the reference frame may be output as a target image.

If it is determined, after comparison between the ultra-short frame and the reference frame, that the colors of the ultra-short frame and the reference frame are different, and it is determined, after comparison between the short frame and the reference frame, that the colors of the short frame and the reference frame are the same, it indicates that the colors of the short frame and all the normal frames are the same, and only the color of the ultra-short frame has changed. In this case, the ultra-short frame may be removed, and only the short frame and the six normal frames are fused to obtain a target image. Alternatively, only the reference frame may be output as a target image.

If it is determined, after comparison between the ultra-short frame and the reference frame, that the colors of the ultra-short frame and the reference frame are the same, and it is determined, after comparison between the short frame and the reference frame, that the colors of the short frame and the reference frame are different, it indicates that the colors of the ultra-short frame and all the normal frames are the same, and only the color of the short frame has changed. In this case, the short frame may be removed, and only the ultra-short frame and the six normal frames are fused to obtain a target image. Alternatively, only the reference frame may be output as a target image.

If it is determined, after comparison between the ultra-short frame and the reference frame, that the colors of the ultra-short frame and the reference frame are different, and it is determined, after comparison between the short frame and the reference frame, that the colors of the short frame and the reference frame are different, it indicates that the colors of all the normal frames are the same, and the colors of the ultra-short frame and the short frame have changed. In this case, the ultra-short frame and the short frame may be removed, and only the six normal frames are fused to obtain a target image. Alternatively, only the reference frame may be output as a target image.

S350: If it is determined, after comparison between the remaining normal frames (the second normal frame to the sixth normal frame) and the reference frame one by one, that colors of only a part of the remaining normal frames are the same as that of the reference frame, it indicates that colors of only a part of the six normal frames are the same.

In this case, if it is determined, after comparison between the ultra-short frame and the reference frame, that the colors of the ultra-short frame and the reference frame are the same, and it is determined, after comparison between the short frame and the reference frame, that the colors of the short frame and the reference frame are also the same, it indicates that the colors of the ultra-short frame, the short frame, the reference frame, and the part of the normal frames with the same color as the reference frame are the same. In this case, the plurality of frames of front-end images with the same color may be fused to obtain a target image, and the remaining frame with a different color is not fused. Alternatively, only the reference frame may be output as a target image.

If it is determined, after comparison between the ultra-short frame and the reference frame, that the colors of the ultra-short frame and the reference frame are different, and it is determined, after comparison between the short frame and the reference frame, that the colors of the short frame and the reference frame are the same, it indicates that the colors of the short frame, the reference frame, and the part of the remaining normal frames with the same color as the reference frame are the same. In this case, the plurality of frames of front-end images with the same color may be fused to obtain a target image, and the remaining frame with a different color is not fused. Alternatively, only the reference frame may be output as a target image.

If it is determined, after comparison between the ultra-short frame and the reference frame, that the colors of the ultra-short frame and the reference frame are the same, and it is determined, after comparison between the short frame and the reference frame, that the colors of the short frame and the reference frame are different, it indicates that the colors of the ultra-short frame, the reference frame, and the part of the remaining normal frames with the same color as the reference frame are the same. In this case, the plurality of frames of front-end images with the same color may be fused to obtain a target image, and the remaining frame with a different color is not fused. Alternatively, only the reference frame may be output as a target image.

If it is determined, after comparison between the ultra-short frame and the reference frame, that the colors of the ultra-short frame and the reference frame are different, and it is determined, after comparison between the short frame and the reference frame, that the colors of the short frame and the reference frame are different, it indicates that the colors of only the reference frame and the part of the remaining normal frames with the same color as the reference frame are the same. In this case, the plurality of frames of front-end images with the same color may be fused to obtain a target image, and the remaining frame with a different color is not fused. Alternatively, only the reference frame may be output as a target image.

S360: If it is determined, after comparison between the remaining normal frames (the second normal frame to the sixth normal frame) and the reference frame one by one, that colors of all the remaining normal frames are different from that of the reference frame, it indicates that all the six normal frames have different colors.

In this case, if it is determined, after comparison between the ultra-short frame and the reference frame, that the colors of the ultra-short frame and the reference frame are the same, and it is determined, after comparison between the short frame and the reference frame, that the colors of the short frame and the reference frame are also the same, it indicates that the colors of only the ultra-short frame, the short frame, and the reference frame in the eight frames of front-end images are the same. In this case, the ultra-short frame, the short frame, and the reference frame with the same color may be fused to obtain a target image, and the remaining frame with a different color is not fused. Alternatively, only the reference frame may be output as a target image.

If it is determined, after comparison between the ultra-short frame and the reference frame, that the colors of the ultra-short frame and the reference frame are different, and it is determined, after comparison between the short frame and the reference frame, that the colors of the short frame and the reference frame are the same, it indicates that the colors of only the short frame and the reference frame in the eight frames of front-end images are the same, and the short frame and the reference frame may be fused to obtain a target image. Alternatively, only the reference frame may be output as a target image.

If it is determined, after comparison between the ultra-short frame and the reference frame, that the colors of the ultra-short frame and the reference frame are the same, and it is determined, after comparison between the short frame and the reference frame, that the colors of the short frame and the reference frame are different, it indicates that the colors of only the ultra-short frame and the reference frame in the eight frames of front-end images are the same. In this case, the ultra-short frame and the reference frame may be fused to obtain a target image. Alternatively, only the reference frame may be output as a target image.

If it is determined, after comparison between the ultra-short frame and the reference frame, that the colors of the ultra-short frame and the reference frame are different, and it is determined, after comparison between the short frame and the reference frame, that the colors of the short frame and the reference frame are also different, it indicates that the colors of the remaining front-end images in the eight frames of front-end images are different from that of the reference frame. In this case, only the reference frame may be output as a target image.

It should be understood that S340 to S360 are different preset processing rules corresponding to different results obtained through the frame color determining.

S370: Perform backend processing on the target image to obtain a backend image.

It should be understood that descriptions of the backend processing are the same as those of S150. Details are not described herein again.

It should be understood that the foregoing is merely an example of the image processing method provided in the embodiments of this application. In another embodiment, a sequence of a part of steps in the method may be changed according to an actual need, or a part of steps may be omitted or deleted. This is not limited in the embodiments of this application.

Figure 12A:
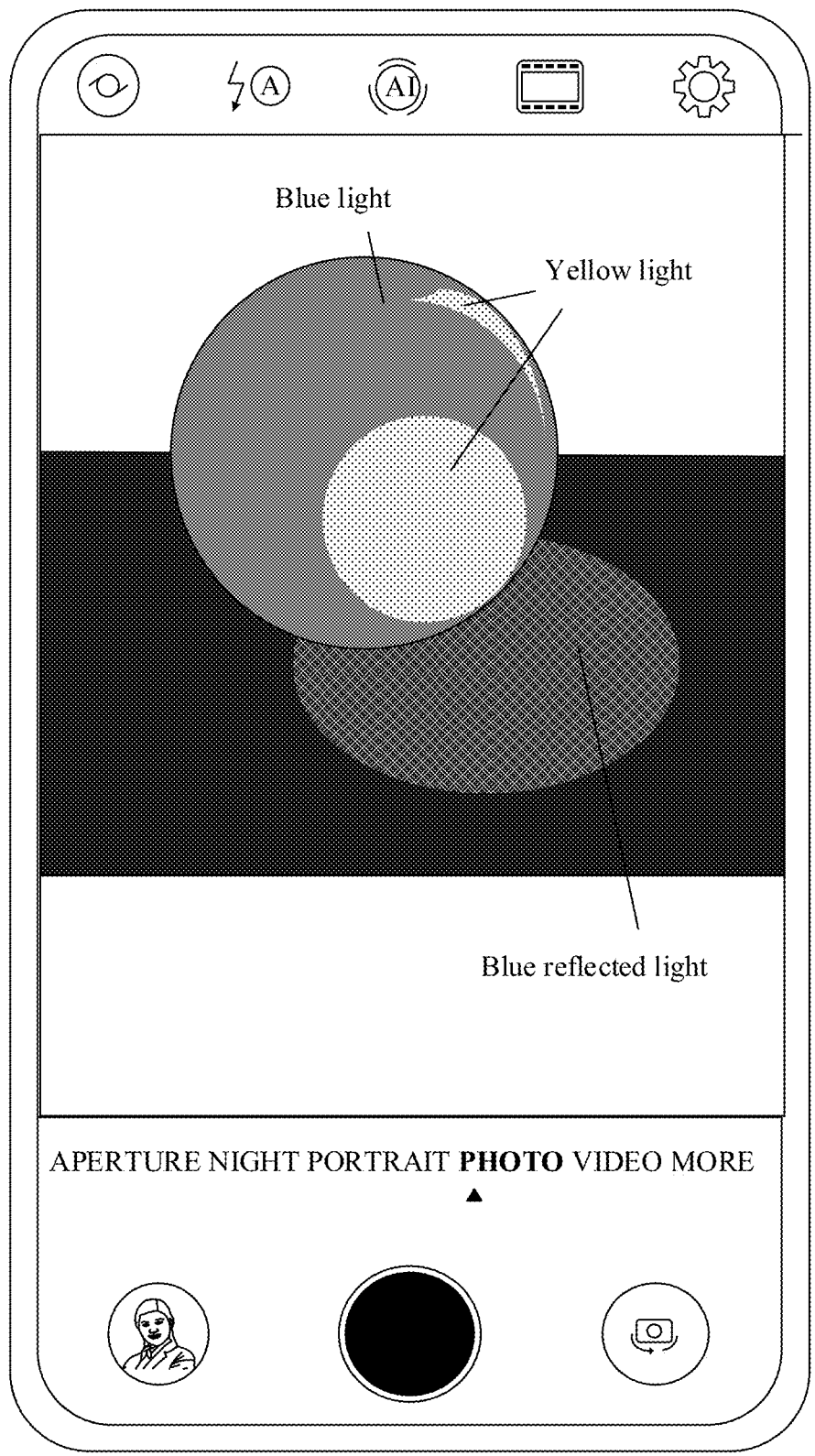
FIG. 12A and FIG. 12B are a schematic diagram of effects according to an embodiment of this application.
Figure 12B:
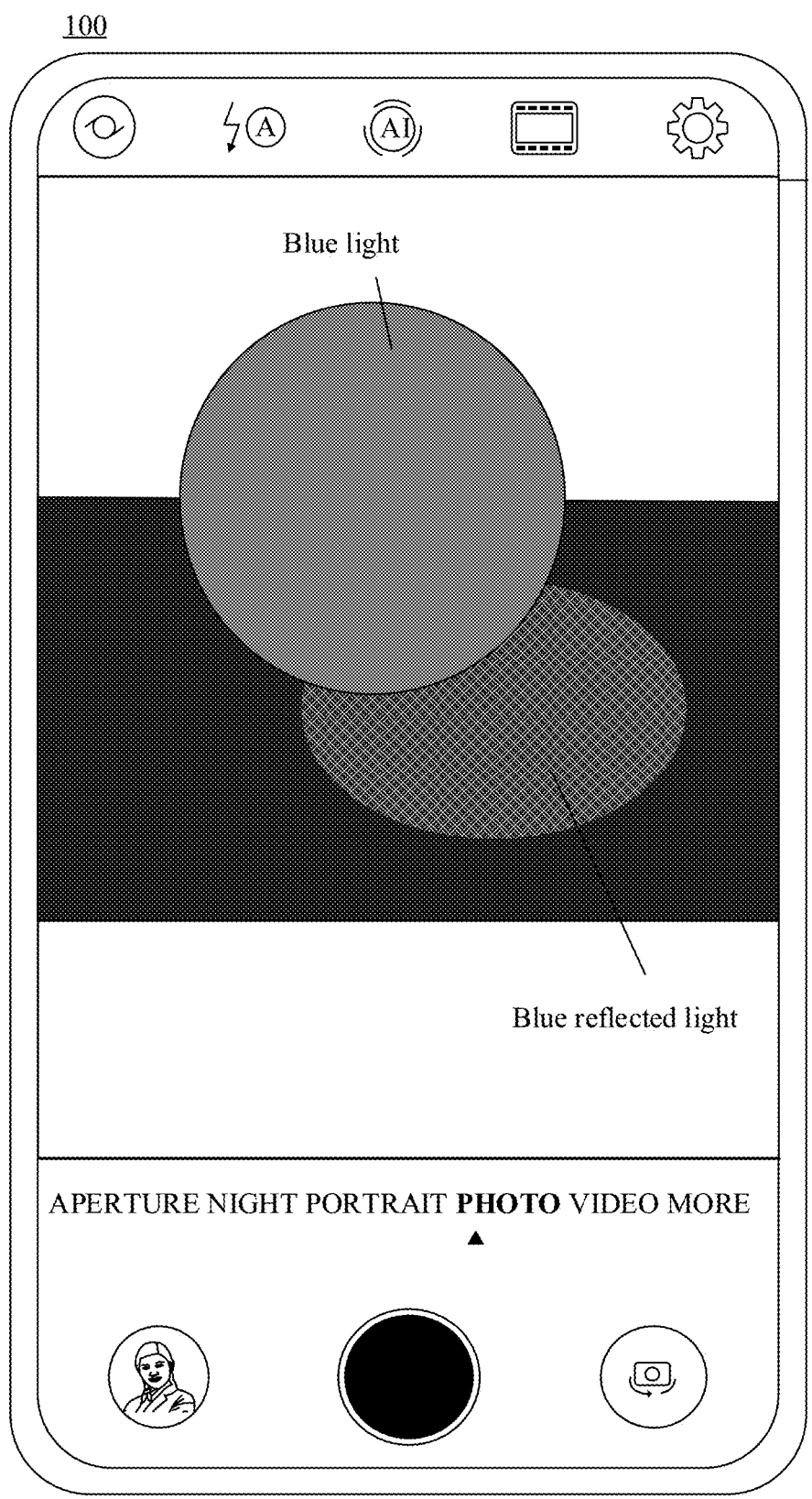

FIG. 12A and FIG. 12B are a schematic diagram of effects according to an embodiment of this application.

With reference to FIG. 1, when a color of a nightlight in a scene to be shot continuously changes, if a conventional image processing method is used, after a plurality of frames of original images are captured and directly fused, a fused image as shown in FIG. 12A may be obtained. Because the plurality of frames of captured original images include original images corresponding to light of different colors, a part in the fused image that originally should reflect blue light reflects yellow light. This causes very poor user experience.

However, after the plurality of frames of original images are captured, an image as shown in FIG. 12B can be obtained after the image processing method provided in the embodiments of this application is used to perform processing. Even if the plurality of frames of captured original images include the original images corresponding to light of different colors, because the image processing method provided in the embodiments of this application is used to perform frame color determining on the plurality of frames of captured original images, after the images with different colors are filtered out, only images with a same color are selected for fusion, or only one frame of image that can represent true color information is output as a final target image. In this way, quality of the target image can be improved, and a user experience effect can be improved.

The image processing method in the embodiments of this application is described in detail above with reference to FIG. 1 to FIG. 12A and FIG. 12B, and a software system and a hardware system of an electronic device, an apparatus, and a chip to which this application is applicable are described in detail below with reference to FIG. 13 to FIG. 16. It should be understood that the software system, the hardware system, the apparatus, and the chip in the embodiments of this application may perform various image processing methods in the foregoing embodiments of this application. That is, for specific working processes of the following various products, refer to corresponding processes in the foregoing method embodiments.

The image processing method provided in the embodiments of this application may be applied to various electronic devices. Correspondingly, the image processing apparatus provided in the embodiments of this application may be electronic devices of various forms.

In some embodiments of this application, the electronic device may be various shooting apparatuses such as a digital single lens reflex camera and a card machine, a mobile phone, a tablet computer, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or the like, or may be another device or apparatus that can perform image processing. A specific type of the electronic device is not limited in the embodiments of this application.

Figure 13:
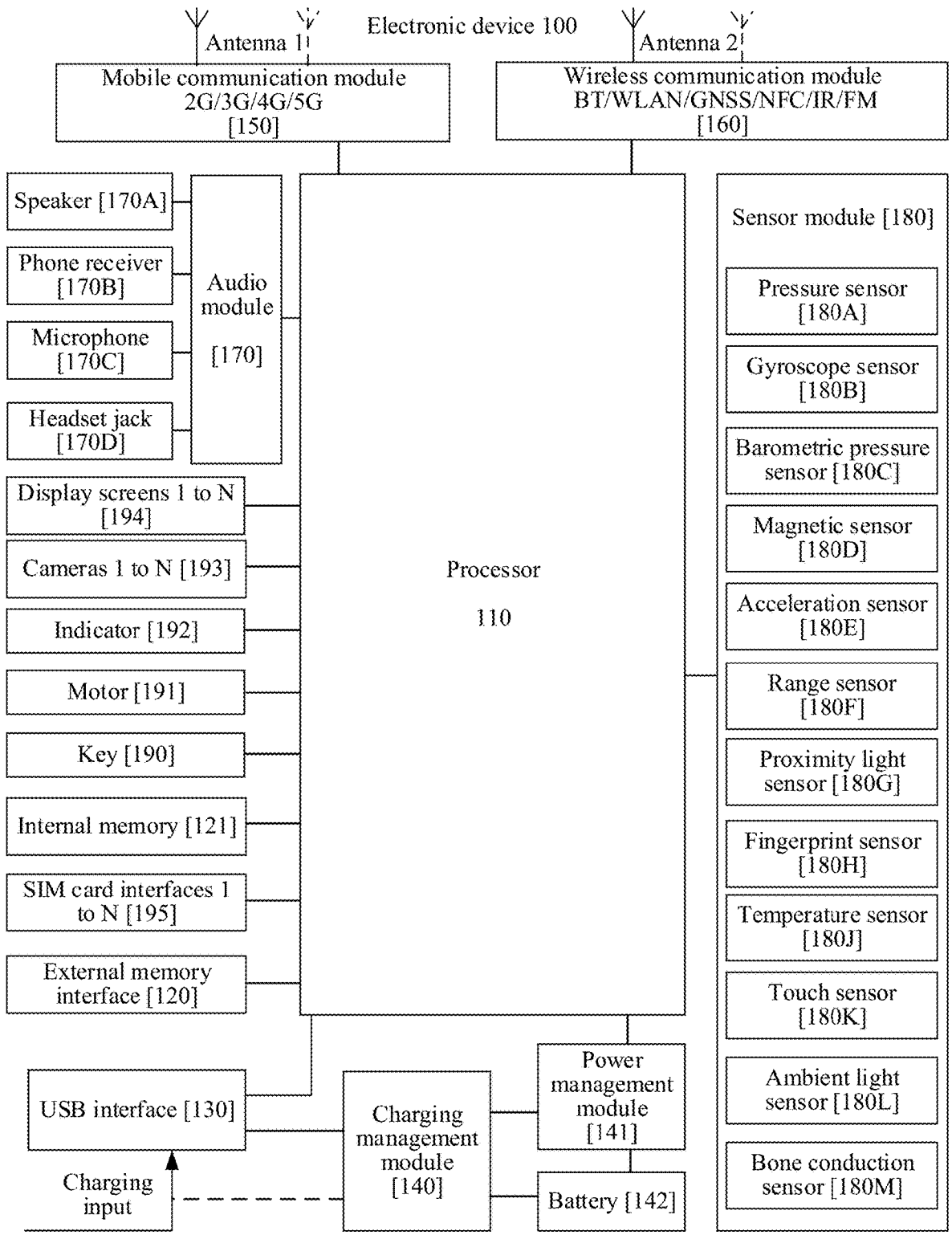
FIG. 13 is a schematic diagram of a hardware system of an apparatus applicable to this application.

For example, in the following, the electronic device is the mobile phone. FIG. 13 is a schematic structural diagram of an electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It should be noted that the structure shown in FIG. 13 does not constitute a specific limitation on the electronic device 100. In some other embodiments of this application, the electronic device 100 may include more or fewer components than those shown in FIG. 13, may include a combination of some of the components shown in FIG. 13, or may include subcomponents of some of the components shown in FIG. 13. The components shown in FIG. 13 may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate components, or may be integrated into one or more processors.

The controller may be a nerve center and a command center of the electronic device 100. The controller may generate an operation control signal according to instruction operation code and a time-sequence signal, and control obtaining and execution of instructions.

A memory may be further disposed in the processor 110, and is configured to store instructions and data. In some embodiments, the memory in the processor 110 is a cache memory. The memory may store instructions or data recently used or cyclically used by the processor 110. If the processor 110 needs to use the instructions or the data again, the processor 110 may directly call the instructions or the data from the memory. This avoids repeated access, and reduces waiting time of the processor 110, thereby improving system efficiency.

The processor 110 may run software code for the image processing method provided in the embodiments of this application, to capture a high-definition image.

The memory 120 is configured to store application program code for executing the solutions of this application, and the processor 110 controls the execution. The memory 120 may be a read-only memory (read-only memory, ROM), another type of static storage device that can store static information and instructions, a RAM, or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction structure or a data structure and that is accessible to a computer, but is not limited thereto. The memory may exist independently, and is connected to the processor via a bus. The memory may alternatively be integrated with the processor.

A wireless communication function of the electronic device 100 may be implemented through the antenna 1, the antenna 2, the mobile communication module 150, the wireless communication module 160, the modem processor, the baseband processor, and the like.

The electronic device 100 implements a display function through the GPU, the display screen 194, the application processor, and the like. The GPU is a microprocessor for image processing and is connected to the display screen 194 and the application processor. The GPU is configured to perform mathematical and geometric calculation, and render graphics. The processor 110 may include one or more GPUs that execute program instructions to generate or change display information.

The display screen 194 is configured to display an image, a video, and the like.

The camera 193 is configured to capture an image or a video, and may be triggered to be on by using an application program instruction, to implement a shooting function, for example, capturing an image of any scene. The camera may include an imaging lens, a filter, an image sensor, and another component. Light emitted or reflected by an object enters the imaging lens, passes through the filter, and finally converges on the image sensor. The image sensor is mainly configured to converge light emitted or reflected by all objects (which may also be referred to as a scene to be shot or a target scene, and may also be understood as a scene image that a user expects to capture) in a camera angle for imaging. The filter is mainly configured to filter out a redundant light wave (for example, a light wave other than visible light, such as infrared) in the light. The image sensor is mainly configured to perform optical-to-electrical conversion on a received optical signal to obtain an electrical signal, and input the electrical signal to the processor 130 for subsequent processing. The camera 193 may be in the front of the electronic device 100 or on the back of the electronic device 100, and a specific quantity and arrangement of cameras may be set according to a requirement. This is not limited in this application.

The internal memory 121 may be configured to store computer-executable program code. The executable program code includes instructions. The internal memory 121 may include a program storage area and a data storage area. The program storage area may store an operating system, an application required by at least one function (such as a sound playback function and an image playback function), and the like. The data storage area may store data (such as audio data and an address book) and the like created when the electronic device 100 is used. In addition, the internal memory 121 may include a high-speed random access memory, and may also include a non-volatile memory, for example, at least one magnetic disk storage device, a flash memory device, or a universal flash storage (universal flash storage, UFS). The processor 110 runs the instructions stored in the internal memory 121 and/or the instructions stored in the memory disposed in the processor, to perform various function applications and data processing of the electronic device 100.

The internal memory 121 may also store software code for the image processing method provided in the embodiments of this application. When running the software code, the processor 110 performs the steps in the procedure for the image processing method, to obtain a high-definition image.

The internal memory 121 may also store a captured image.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music are stored in the external storage card.

Certainly, the software code for the image processing method provided in the embodiments of this application may alternatively be stored in the external memory. The processor 110 may run the software code through the external memory interface 120, to perform the steps in the procedure for the image processing method, thereby obtaining a high-definition image. The image captured by the electronic device 100 may also be stored in the external memory.

It should be understood that a user may designate whether the image is to be stored in the internal memory 121 or the external memory. For example, when the electronic device 100 is currently connected to the external memory, if the electronic device 100 captures one frame of image, prompt information may pop up to remind the user whether to store the image in the external memory or the internal memory. Certainly, there may be another designation manner. This is not limited in this embodiment of this application. Alternatively, when detecting that an internal storage amount of the internal memory 121 is less than a preset amount, the electronic device 100 may automatically store the image in the external memory.

The electronic device 100 may implement audio functions through the audio module 170, the speaker 170A, the phone receiver 170B, the microphone 170C, the headset jack 170D, the application processor, and the like. For example, the audio functions are music playing and recording.

In this embodiment of this application, the camera 193 may capture a plurality of frames of exposure images. The processor 110 performs image processing on the plurality of frames of exposure images, where the image processing may include image registration, lens shading correction, black level correction, noise reduction, auto white balance, downsampling, frame color determining, fusion, nonlinear superposition, ghost correction, and the like. A target image with a good color effect and a good noise suppression effect can be obtained through the image processing. Then, the processor 110 may control the display screen 194 to present the processed target image, where the target image is an image captured in a scene in which a color of a light source changes.

A hardware system of the electronic device 100 is described in detail above, and a software system of the electronic device 100 is described below. The software system may be in a hierarchical architecture, an event driven architecture, a microcore architecture, a microservice architecture, or a cloud architecture. The hierarchical architecture is used as an example in the embodiments of this application to describe an example of the software system of the electronic device 100.

Figure 14:
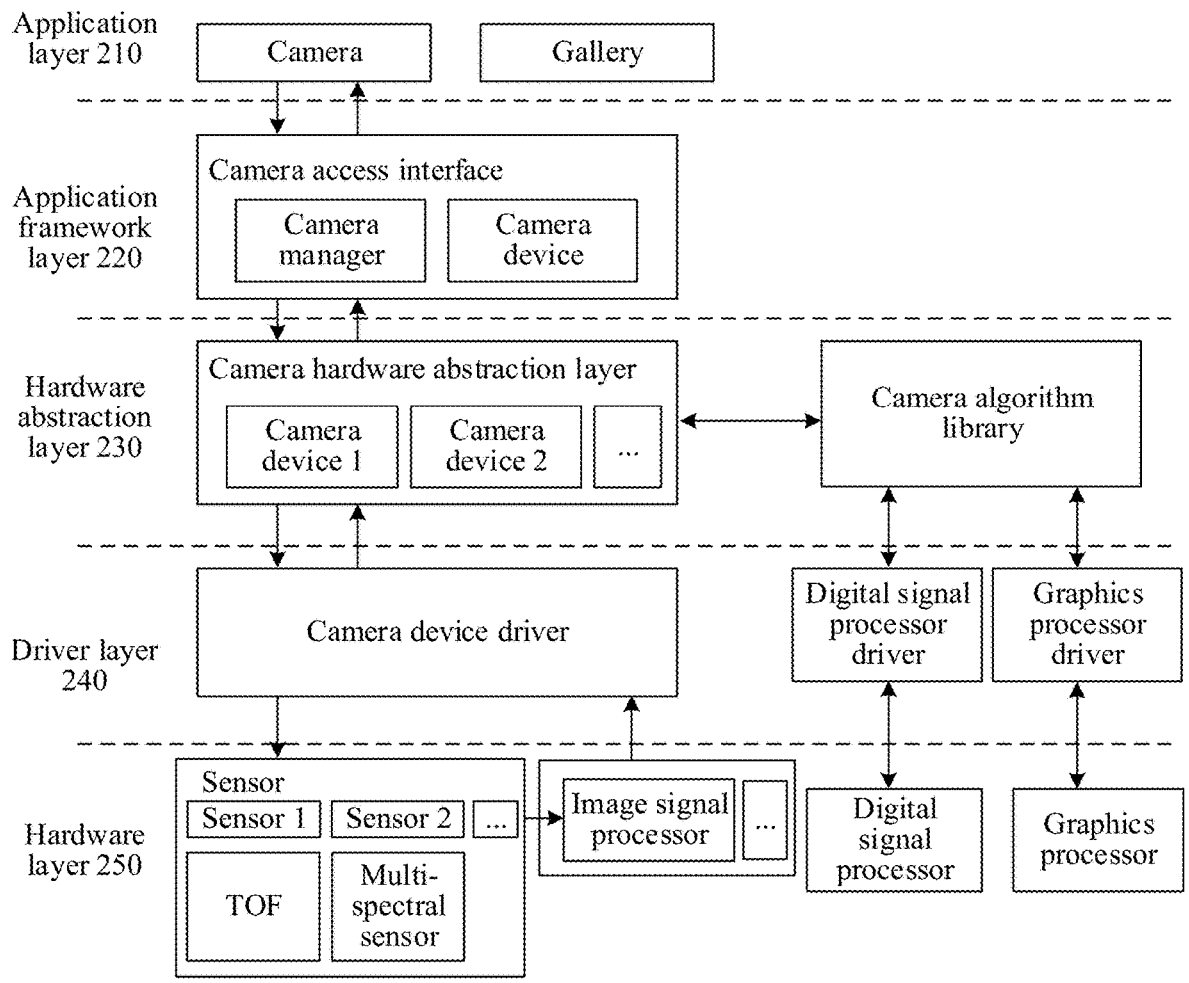
FIG. 14 is a schematic diagram of a software system of an apparatus applicable to this application.

As shown in FIG. 14, the software system in the hierarchical architecture is divided into several layers, and each layer has a clear role and task. Layers communicate with each other through a software interface. In some embodiments, the software system may be divided into five layers that are respectively an application layer 210, an application framework layer 220, a hardware abstraction layer 230, a driver layer 240, and a hardware layer 250 from top to bottom.

The application layer 210 may include camera and gallery, and may further include applications such as calendar, phone, maps, navigation, WLAN, Bluetooth, music, videos, and SMS messages.

The application framework layer 220 provides an application access interface and a programming framework for the applications at the application layer 210.

For example, the application framework layer includes a camera access interface for providing a camera shooting service through a camera manager and a camera device.

The camera manager at the application framework layer 220 is configured to manage the camera. The camera manager can obtain a parameter of the camera, for example, determine a working state of the camera.

The camera device at the application framework layer 220 is configured to provide a data access interface between the camera device and the camera manager.

The hardware abstraction layer 230 is used to abstract the hardware. For example, the hardware abstraction layer may include a camera hardware abstraction layer and another hardware device abstraction layer. The camera hardware abstraction layer may include a camera device 1, a camera device 2, and the like. The camera hardware abstraction layer may be connected to a camera algorithm library, and may call an algorithm in the camera algorithm library.

The driver layer 240 is used to provide drivers for different hardware devices. For example, the driver layer may include a camera driver, a digital signal processor driver, and a graphics processor driver.

The hardware layer 250 may include a sensor, an image signal processor, a digital signal processor, a graphics processor, and another hardware device. The sensor may include a sensor 1, a sensor 2, and the like, and may also include a time of flight (time of flight, TOF) sensor and a multi-spectral sensor.

The following describes an example of a working process of the software system of the electronic device 100 with reference to a displaying and shooting scenario.

When a user performs a one-tap operation on the touch sensor 180K, after the camera APP is awakened by the one-tap operation, the camera APP calls each camera device at the camera hardware abstraction layer through the camera access interface. For example, the camera hardware abstraction layer may deliver an instruction for calling a specific camera to a camera device driver, and the camera algorithm library starts to load the frame color determining method used in the embodiments of this application.

After the sensor at the hardware layer is called, for example, a sensor 1 in a specific camera is called to obtain a plurality of frames of exposure images with different exposure values, and send the plurality of frames of exposure images to the image signal processor for front-end processing such as image registration. A plurality of frames of processed exposure images are returned to the hardware abstraction layer through the camera device driver, then are compared and filtered by using the loaded frame color determining method in the camera algorithm library, and processed according to a comparison result of the frame color determining method and a corresponding preset processing rule to obtain a target image. The frame color determining method and the corresponding processing rule may be implemented by the digital signal processor driver by calling the digital signal processor and by the graphics processor driver by calling the graphics processor.

The obtained target image is sent back to the camera application through the camera hardware abstraction layer and the camera access interface for display and storage.

Figure 15:
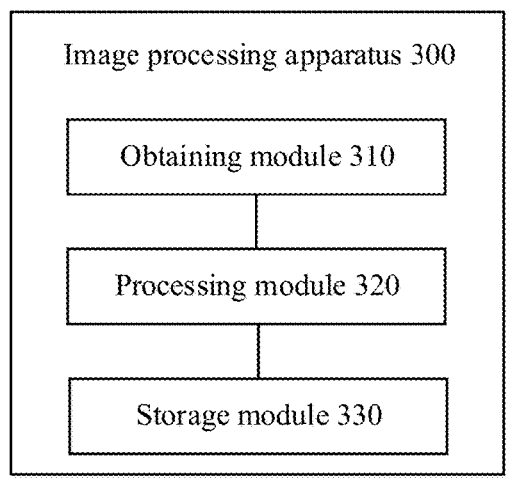
FIG. 15 is a schematic structural diagram of an image processing apparatus according to an embodiment of this application.

FIG. 15 is a schematic structural diagram of an image processing apparatus according to an embodiment of this application. As shown in FIG. 15, the image processing apparatus 300 includes an obtaining module 310, a processing module 320, and a storage module 330.

The image processing apparatus 300 can execute the following solution:

The processing module 320 is configured to determine whether a first preset condition is met, and instruct the obtaining module 310 to capture M frames of images.

The obtaining module 310 is configured to obtain the M frames of images. The M frames of images include a first exposure image, a second exposure image, and a third exposure image, an exposure value of the first exposure image is less than an exposure value of the second exposure image, and the exposure value of the second exposure image is less than an exposure value of the third exposure image, where M is an integer greater than or equal to 2.

The processing module 320 is configured to: determine that the first exposure image and the third exposure image meet a second preset condition, and that the second exposure image and the third exposure image meet the second preset condition; and fuse the first exposure image, the second exposure image, and the third exposure image to obtain a first target image.

The storage module 330 is configured to store the first target image.

Optionally, the M frames of images further include a fourth exposure image, and an exposure value of the fourth exposure image is equal to the exposure value of the third exposure image. The processing module 320 is further configured to:

determine that the first exposure image and the third exposure image meet the second preset condition, that the second exposure image and the third exposure image meet the second preset condition, and that the fourth exposure image and the third exposure image meet the second preset condition; and fuse the first exposure image, the second exposure image, the third exposure image, and the fourth exposure image to obtain a second target image.

The storage module 330 is configured to store the second target image.

Optionally, the processing module 320 is further configured to:

determine that the first exposure image and the third exposure image do not meet the second preset condition, and that the second exposure image and the third exposure image meet the second preset condition; and fuse the second exposure image and the third exposure image to obtain a third target image.

The storage module 330 is configured to store the third target image.

Optionally, when the M frames of images further include the fourth exposure image, the exposure value of the fourth exposure image is equal to the exposure value of the third exposure image. The processing module 320 is further configured to:

determine that the first exposure image and the third exposure image do not meet the second preset condition, that the second exposure image and the third exposure image meet the second preset condition, and that the fourth exposure image and the third exposure image meet the second preset condition; and fuse the second exposure image, the third exposure image, and the fourth exposure image to obtain a fourth target image.

The storage module 330 is configured to store the fourth target image.

Optionally, the processing module 320 is further configured to:

determine that the first exposure image and the third exposure image meet the second preset condition, and that the second exposure image and the third exposure image do not meet the second preset condition; and fuse the first exposure image and the third exposure image to obtain a fifth target image.

The storage module 330 is configured to store the fifth target image.

Optionally, when the M frames of images further include the fourth exposure image, the exposure value of the fourth exposure image is equal to the exposure value of the third exposure image. The processing module 320 is further configured to:

determine that the first exposure image and the third exposure image meet the second preset condition, that the second exposure image and the third exposure image do not meet the second preset condition, and that the fourth exposure image and the third exposure image meet the second preset condition; and fuse the first exposure image, the third exposure image, and the fourth exposure image to obtain a sixth target image.

The storage module 330 is configured to store the sixth target image.

Optionally, the processing module 320 is further configured to:

determine that the first exposure image and the third exposure image do not meet the second preset condition, and that the second exposure image and the third exposure image do not meet the second preset condition; and determine that the third exposure image is a seventh target image.

The storage module 330 is configured to store the seventh target image.

Optionally, when the M frames of images further include the fourth exposure image, the exposure value of the fourth exposure image is equal to the exposure value of the third exposure image. The processing module 320 is further configured to:

determine that the first exposure image and the third exposure image do not meet the second preset condition, that the second exposure image and the third exposure image do not meet the second preset condition, and that the fourth exposure image and the third exposure image meet the second preset condition; and fuse the third exposure image and the fourth exposure image to obtain an eighth target image.

The storage module 330 is configured to store the eighth target image.

Optionally, the processing module 320 is further configured to:

perform front-end processing on the M frames of images to obtain M frames of processed images.

Optionally, the front-end processing includes: at least one of image registration, lens shading correction, black level correction, noise reduction, auto white balance, and down-sampling.

Optionally, the processing module 320 is further configured to:

perform backend processing on a target image to obtain a backend image, where the target image includes at least one of the first target image, the second target image, the third target image, the fourth target image, the fifth target image, the sixth target image, the seventh target image, and the eighth target image.

Optionally, the backend processing includes: at least one of nonlinear superposition and ghost correction.

It should be noted that the image processing apparatus 300 is presented in a form of functional modules. The term "module" herein may be implemented in a form of software and/or hardware. This is not specifically limited.

For example, the "module" may be a software program or a hardware circuit that implements the foregoing functions, or a combination thereof. The hardware circuit may include an application specific integrated circuit (application specific integrated circuit, ASIC), an electronic circuit, a processor (for example, a shared processor, a dedicated processor, or a packet processor) configured to execute one or more software or firmware programs and a memory, a combined logic circuit, and/or another suitable component that supports the described functions.

Therefore, the modules in various examples described in the embodiments of this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

An embodiment of this application further provides another electronic device, including one or more processors and a memory.

The memory is coupled to the one or more processors, and is configured to store computer program code, where the computer program code includes computer instructions.

The one or more processors invoke the computer instructions to cause the electronic device to perform the steps processed in the foregoing image processing method.

An embodiment of this application further provides a computer-readable storage medium, where the computer-readable storage medium stores computer instructions. When the computer-readable storage medium runs on an image processing apparatus, the image processing apparatus is caused to perform the method shown in FIG. 10A and FIG. 10B or FIG. 11A and FIG. 11B. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium, or a semiconductor medium (for example, a solid state disk (solid state disk, SSD)), or the like.

An embodiment of this application further provides a computer program product including computer instructions. When the computer program product runs on an image processing apparatus, the image processing apparatus is caused to perform the method shown in FIG. 10A and FIG. 10B or FIG. 11A and FIG. 11B.

Figure 16:
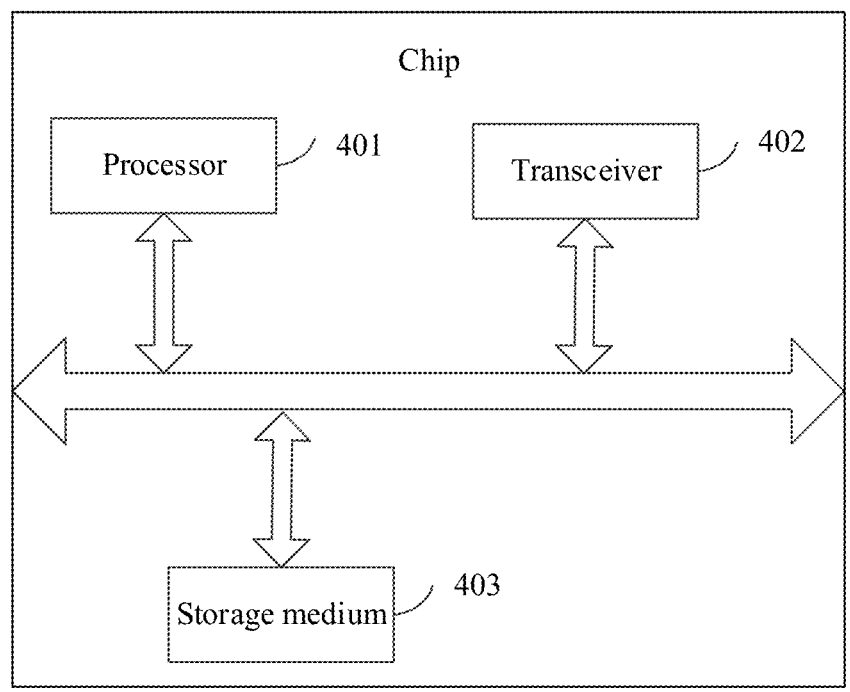
FIG. 16 is a schematic structural diagram of a chip according to an embodiment of this application.

FIG. 16 is a schematic structural diagram of a chip according to an embodiment of this application. The chip shown in FIG. 16 may be a general-purpose processor, or may be a special-purpose processor. The chip includes a processor 401. The processor 401 is configured to support an image processing apparatus in performing the technical solution shown in FIG. 10A and FIG. 10B or FIG. 11A and FIG. 11B.

Optionally, the chip further includes a transceiver 402. The transceiver 402 is configured to receive control from the processor 401 to support a communication apparatus in performing the technical solution shown in FIG. 10A and FIG. 10B or FIG. 11A and FIG. 11B.

Optionally, the chip shown in FIG. 16 may further include a storage medium 403.

It should be noted that the chip shown in FIG. 16 may be implemented in the following circuit or component: one or more field programmable gate arrays (field programmable gate array, FPGA), a programmable logic device (programmable logic device, PLD), a controller, a state machine, a gate logic, a discrete hardware part, any other appropriate circuit, or any combination of circuits capable of executing various functions described throughout this application.

The electronic device, the image processing apparatus, the computer storage medium, the computer program product, and the chip provided in the foregoing embodiments of this application are all configured to perform the method provided above. Therefore, for beneficial effects that can be achieved by the electronic device, the image processing apparatus 300, the computer storage medium, the computer program product, and the chip, refer to the beneficial effects corresponding to the method provided above. Details are not described herein again.

It should be understood that the foregoing descriptions are intended to help a person skilled in the art to better understand the embodiments of this application, but not to limit the scope of the embodiments of this application. A person skilled in the art obviously may perform various equivalent modifications or changes according to the given examples. For example, some steps in the embodiments of the foregoing image processing method may be unnecessary, some steps may be newly added, or any two or more of the foregoing embodiments may be combined. A modified, changed or combined solution also falls within the scope of the embodiments of this application.

It should be further understood that the foregoing descriptions of the embodiments of this application emphasize differences between the embodiments. For the same or similar descriptions not mentioned, reference may be made to each other. For brevity, details are not described herein again.

It should be further understood that sequence numbers of the foregoing processes do not indicate an execution sequence, and an execution sequence of processes shall be determined based on functions and internal logic thereof, and shall constitute no limitation on an implementation process of the embodiments of this application.

It should be further understood that in the embodiments of this application, "preset" and "pre-define" may be realized by pre-storing corresponding code and tables in a device (such as an electronic device) or in another manner for indicating related information. A specific implementation thereof is not limited in this application.

It should be further understood that classification of manners, cases, categories, and embodiments in the embodiments of this application merely aims to facilitate description rather than constituting specific limitations, and characteristics in various manners, categories, cases, and embodiments may be combined without contradictions.

It should be further understood that in the embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

Finally, it should be noted that: The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method, applied to an electronic device that comprises a camera, wherein the method comprises:
    detecting, by a processor of an electronic device, a first operation;
    turning on the camera in response to the first operation;
    determining, by the processor, that a first preset condition is met, and capturing M frames of images, wherein the M frames of images comprise a first exposure image, a second exposure image, and a third exposure image, an exposure value of the first exposure image is less than an exposure value of the second exposure image, and the exposure value of the second exposure image is less than an exposure value of the third exposure image, wherein M is an integer greater than or equal to 2;
    determining, by the processor, that the first exposure image and the third exposure image meet a second preset condition, and that the second exposure image and the third exposure image meet the second preset condition;
    fusing, by the processor, the first exposure image, the second exposure image, and the third exposure image to obtain a first target image; and
    storing the first target image.

2. The method according to claim 1, wherein
    the M frames of images further comprise a fourth exposure image, and an exposure value of the fourth exposure image is equal to the exposure value of the third exposure image;
    and wherein the method further comprises:
    determining, by the processor, that the first exposure image and the third exposure image meet the second preset condition, that the second exposure image and the third exposure image meet the second preset condition, and that the fourth exposure image and the third exposure image meet the second preset condition;
    fusing, by the processor, the first exposure image, the second exposure image, the third exposure image, and the fourth exposure image to obtain a second target image; and
    storing the second target image.

3. The method according to claim 1, wherein the method further comprises:
    determining, by the processor, that the first exposure image and the third exposure image do not meet the second preset condition, and that the second exposure image and the third exposure image meet the second preset condition;
    fusing, by the processor, the second exposure image and the third exposure image to obtain a third target image; and
    storing the third target image.

4. The method according to claim 3, wherein the method further comprises:
    when the M frames of images further comprise the fourth exposure image, the exposure value of the fourth exposure image is equal to the exposure value of the third exposure image;
    determining, by the processor, that the first exposure image and the third exposure image do not meet the second preset condition, that the second exposure image and the third exposure image meet the second preset condition, and that the fourth exposure image and the third exposure image meet the second preset condition;
    fusing, by the processor, the second exposure image, the third exposure image, and the fourth exposure image to obtain a fourth target image; and
    storing the fourth target image.

5. The method according to claim 1, wherein the method further comprises:
    determining, by the processor, that the first exposure image and the third exposure image meet the second preset condition, and that the second exposure image and the third exposure image do not meet the second preset condition;
    fusing, by the processor, the first exposure image and the third exposure image to obtain a fifth target image; and
    storing the fifth target image.

6. The method according to claim 5, wherein the method further comprises:
    when the M frames of images further comprise the fourth exposure image, the exposure value of the fourth exposure image is equal to the exposure value of the third exposure image;
    determining, by the processor, that the first exposure image and the third exposure image meet the second preset condition, that the second exposure image and the third exposure image do not meet the second preset condition, and that the fourth exposure image and the third exposure image meet the second preset condition;
    fusing, by the processor, the first exposure image, the third exposure image, and the fourth exposure image to obtain a sixth target image; and
    storing the sixth target image.

7. The method according to claim 1, wherein the method further comprises:
    determining, by the processor, that the first exposure image and the third exposure image do not meet the second preset condition, and that the second exposure image and the third exposure image do not meet the second preset condition;
determining, by the processor, that the third exposure image is a seventh target image; and
storing the seventh target image.

8. The method according to claim 7, wherein the method further comprises:
when the M frames of images further comprise the fourth exposure image, the exposure value of the fourth exposure image is equal to the exposure value of the third exposure image;
determining, by the processor, that the first exposure image and the third exposure image do not meet the second preset condition, that the second exposure image and the third exposure image do not meet the second preset condition, and that the fourth exposure image and the third exposure image meet the second preset condition;
fusing, by the processor, the third exposure image and the fourth exposure image to obtain an eighth target image; and
storing the eighth target image.

9. The method according to claim 1, wherein the method further comprises:
performing front-end processing on the M frames of images to obtain M frames of processed exposure images.

10. The method according to claim 9, wherein the front-end processing comprises:
at least one of image registration, lens shading correction, black level correction, noise reduction, auto white balance, and down-sampling.

11. The method according to claim 1, wherein the method further comprises:
performing, by the processor, backend processing on a target image to obtain a backend image, wherein the target image comprises at least one of the first target image, the second target image, the third target image, the fourth target image, the fifth target image, the sixth target image, the seventh target image, and the eighth target image.

12. The method according to claim 11, wherein the backend processing comprises:
at least one of nonlinear superposition and ghost correction.

13. An electronic device, wherein the electronic device comprises:
one or more processors and a memory, wherein
the memory is coupled to the one or more processors, the memory is configured to store computer program code, the computer program code comprises computer instructions, and the one or more processors invoke the computer instructions to cause the electronic device to perform an image processing method, the method comprising:
detecting a first operation;
turning on the camera in response to the first operation;
determining that a first preset condition is met, and capturing M frames of images, wherein the M frames of images comprise a first exposure image, a second exposure image, and a third exposure image, an exposure value of the first exposure image is less than an exposure value of the second exposure image, and the exposure value of the second exposure image is less than an exposure value of the third exposure image, wherein M is an integer greater than or equal to 2;

determining that the first exposure image and the third exposure image meet a second preset condition, and that the second exposure image and the third exposure image meet the second preset condition;
fusing the first exposure image, the second exposure image, and the third exposure image to obtain a first target image; and
storing the first target image.

14. The electronic device according to claim 13, wherein the M frames of images further comprise a fourth exposure image, and an exposure value of the fourth exposure image is equal to the exposure value of the third exposure image, and wherein the method further comprises:
determining that the first exposure image and the third exposure image meet the second preset condition, that the second exposure image and the third exposure image meet the second preset condition, and that the fourth exposure image and the third exposure image meet the second preset condition;
fusing the first exposure image, the second exposure image, the third exposure image, and the fourth exposure image to obtain a second target image; and
storing the second target image.

15. The electronic device according to claim 13, wherein the method further comprises:
determining that the first exposure image and the third exposure image do not meet the second preset condition, and that the second exposure image and the third exposure image meet the second preset condition;
fusing the second exposure image and the third exposure image to obtain a third target image; and
storing the third target image.

16. The electronic device according to claim 15, wherein the method further comprises:
when the M frames of images further comprise the fourth exposure image, the exposure value of the fourth exposure image is equal to the exposure value of the third exposure image;
determining that the first exposure image and the third exposure image do not meet the second preset condition, that the second exposure image and the third exposure image meet the second preset condition, and that the fourth exposure image and the third exposure image meet the second preset condition;
fusing the second exposure image, the third exposure image, and the fourth exposure image to obtain a fourth target image; and
storing the fourth target image.

17. The electronic device according to claim 13, wherein the method further comprises:
determining that the first exposure image and the third exposure image meet the second preset condition, and that the second exposure image and the third exposure image do not meet the second preset condition;
fusing the first exposure image and the third exposure image to obtain a fifth target image; and
storing the fifth target image.

18. The electronic device according to claim 17, wherein the method further comprises:
when the M frames of images further comprise the fourth exposure image, the exposure value of the fourth exposure image is equal to the exposure value of the third exposure image;
determining that the first exposure image and the third exposure image meet the second preset condition, that the second exposure image and the third exposure image do not meet the second preset condition, and that the fourth exposure image and the third exposure image meet the second preset condition;

fusing the first exposure image, the third exposure image, and the fourth exposure image to obtain a sixth target image; and storing the sixth target image.

19. The electronic device according to claim 13, wherein the method further comprises:

determining that the first exposure image and the third exposure image do not meet the second preset condition, and that the second exposure image and the third exposure image do not meet the second preset condition;

determining that the third exposure image is a seventh target image; and storing the seventh target image.

20. A non-transitory computer-readable storage medium, wherein the computer-readable storage medium stores a computer program, and the computer program, when executed by a processor, causes the processor to perform an image processing method the method comprising:

detecting a first operation;

turning on the camera in response to the first operation;

determining that a first preset condition is met, and capturing M frames of images, wherein the M frames of images comprise a first exposure image, a second exposure image, and a third exposure image, an exposure value of the first exposure image is less than an exposure value of the second exposure image, and the exposure value of the second exposure image is less than an exposure value of the third exposure image, wherein M is an integer greater than or equal to 2;

determining that the first exposure image and the third exposure image meet a second preset condition, and that the second exposure image and the third exposure image meet the second preset condition;

fusing the first exposure image, the second exposure image, and the third exposure image to obtain a first target image; and storing the first target image.

* * * * *